US008277100B2

(12) United States Patent
Tokunaga

(10) Patent No.: US 8,277,100 B2
(45) Date of Patent: Oct. 2, 2012

(54) VEHICLE LIGHTING DEVICE

(75) Inventor: Hiroto Tokunaga, Tokyo (JP)

(73) Assignee: Ichikoh Industries, Ltd., Tokyo (JP)

(*) Notice: Subject to any disclaimer, the term of this patent is extended or adjusted under 35 U.S.C. 154(b) by 394 days.

(21) Appl. No.: 12/556,763

(22) Filed: Sep. 10, 2009

(65) Prior Publication Data

US 2010/0067251 A1 Mar. 18, 2010

(30) Foreign Application Priority Data

Sep. 17, 2008 (JP) ................................ 2008-238234

(51) Int. Cl.
*B60Q 1/00* (2006.01)

(52) U.S. Cl. ........ 362/547; 362/294; 362/545; 362/612; 362/800

(58) Field of Classification Search .................. 362/294, 362/373, 396, 457, 543–545, 555, 612, 800, 362/547
See application file for complete search history.

(56) References Cited

U.S. PATENT DOCUMENTS

| | | | | |
|---|---|---|---|---|
| 7,290,913 | B2 * | 11/2007 | Watanabe et al. | 362/545 |
| 2008/0062698 | A1 * | 3/2008 | Tai et al. | 362/294 |

FOREIGN PATENT DOCUMENTS

| | | | |
|---|---|---|---|
| JP | 2000-021211 | A | 1/2000 |
| JP | 2005-209538 | A | 8/2005 |
| JP | 2007-048695 | | 2/2007 |
| JP | 2007-194173 | A | 8/2007 |

OTHER PUBLICATIONS

David F. Rogers et al., Mathematical Elements for Computer Graphics, 1990, pp. 445-446 and cover pages (5 pages total).

* cited by examiner

*Primary Examiner* — Stephen F Husar
*Assistant Examiner* — Meghan Dunwiddie
(74) *Attorney, Agent, or Firm* — Foley & Lardner LLP

(57) ABSTRACT

A vehicle lighting device includes: a heat sink member; a semiconductor-type light source directly placed on a top face of the heat sink member; a power-feeding holder which is set on the semiconductor-type light source and the heat sink member, for holding the semiconductor-type light source at the side of the heat sink member and feeding a power current to the semiconductor-type light source; and a fixing member which is covered on the power-feeding holder and fixed to the heat sink member, for fixing the power-feeding holder to the heat sink member and sandwiching and fixing the semiconductor-type light source between the power-feeding holder and the heat sink member. As a result, this vehicle light device improves workability of assembling components.

9 Claims, 19 Drawing Sheets

VEHICLE LIGHTING DEVICE

CROSS-REFERENCE TO RELATED APPLICATIONS

This application claims priority of Japanese Patent Application No. 2008-238234 filed on Sep. 17, 2008. The contents of this application are incorporated herein by reference in their entirety.

BACKGROUND OF THE INVENTION

1. Field of the Invention

The present invention relates to a vehicle lighting device using a semiconductor-type light source such as an LED as a light source.

2. Description of the Related Art

A vehicle lighting device of this type has been conventionally known (Japanese Laid-open Patent Application No. 2007-48695, for example). Hereinafter, the above vehicle lighting device will be described. The conventional vehicle lighting device is provided with: a bracket made of a vertical panel, which has an opening, and a unit mounting portion; a light emitting element as an LED assembly for housing a diode in a synthetic resin-based assembly case; and a plate-shaped spring member for fixing and holding the light emitting element at the unit mounting portion via the opening, and is adapted to mount a power-feeding connector to a connector attachment port of the LED assembly case of the light emitting element. In the conventional vehicle lighting device, when the LED of the light emitting element is lit to emit light, the light from the LED is radiated to the outside, and illuminates the outside.

However, in the conventional vehicle lighting device, the light emitting element having the diode housed in the assembly case is fixed and held at the unit mounting portion via the opening by means of the plate-shaped spring member. Therefore, the conventional vehicle lighting device entails problems concerning assembling between the assembly case and the diode of the light emitting element; and assembling among the light emitting element, the unit mounting portion, and the plate-shaped spring member, i.e., workability of assembling components.

The present invention has been made in order to solve the above-described problems on workability of assembling components that the conventional lighting device entails.

SUMMARY OF THE INVENTION

A first aspect of the present invention is directed to a vehicle lighting device, comprising:

(i) a heat sink member;

(ii) a semiconductor-type light source which is directly placed on a top face of the heat sink member;

(iii) a power-feeding holder which is set on the semiconductor-type light source and the heat sink member, for holding the semiconductor-type light source at a side of the heat sink member and feeding a power current to the semiconductor-type light source; and (iv) a fixing member which is adapted to cover the power-feeding holder and is fixed to the heat sink member, for fixing the power-feeding holder to the heat sink member and sandwiching and fixing the semiconductor-type light source between the power-feeding holder and the heat sink member, wherein: a light sources-side connector to which a power source-side connector electrically connects is provided at a portion of the power-feeding holder, at an opposite side to a direction in which light from the semiconductor-type light source is radiated.

A second aspect of the present invention is directed to the vehicle lighting device according to the first aspect, wherein:

a rear face member is provided at a portion of the heat sink member, at an opposite side to a direction in which light from the semiconductor-type light source is radiated; and an accommodation hole in which the light source-side connector is accommodated is provided at the rear face member.

A third aspect of the present invention is directed to the vehicle lighting device according to the first aspect, wherein:

a lock hole in which a lock portion of the power source-side connector is locked is provided at the light source-side connector.

A fourth aspect of the present invention is directed to the vehicle lighting device according to the first aspect, wherein:

a positioning portion for determining a position in one direction of the semiconductor-type light source;

a spring portion having a spring force acting on a crossing direction with respect to a positioning direction of the positioning portion; and a receptacle portion which is opposite to the spring portion with the semiconductor-type light source being sandwiched in a direction in which the elastic force of the spring portion acts, for receiving the semiconductor-type light source being held by an elastic force of the spring portion, are provided on the top face on which the semiconductor-type light source is placed, of the heat sink member, and wherein:

a positioning portion for determining a mutual position of the heat sink member and the power-feeding holder is provided at a respective one of the power-feeding holder and the heat sink member opposite to each other with the semiconductor-type light source being sandwiched therebetween.

A fifth aspect of the present invention is directed to a vehicle lighting device, comprising:

(i) a heat sink member having a recessed storage portion;

(ii) a semiconductor-type light source for light radiation, which is placed in the storage portion of the heat sink member;

(iii) a light source fixing portion for fixing the semiconductor light source in the storage portion of the heat sink member and connecting to a power source in order to feed a power current to the semiconductor-type light source fixed in the storage portion, wherein: the light source fixing portion is arranged in the storage portion of the heat sink member in a state in which the semiconductor-type light source is placed in the storage portion of the heat sink member; and the semiconductor-type light source is sandwiched and fixed between the light source fixing portion and the storage portion of the heat sink member in the storage portion of the heat sink member.

A sixth aspect of the present invention is directed to the vehicle lighting device according to the fifth aspect, wherein:

the light source fixing portion includes:

a power-feeding holder which is set on the semiconductor-type light source and the heat sink member, for holding the semiconductor-type light source in the storage portion of the heat sink member; and a fixing member which is arranged on the power-feeding holder in the storage portion of the heat sink member in a state in which the power-feeding holder holds the semiconductor-type light source, in the storage portion of the heat sink member; and the fixing member includes an engagement portion engaging with the storage portion of the heat sink member, for fixing the power-feeding holder to a side of the storage portion of the heat sink member and sandwiching and fixing the semiconductor-type light source between the power-feeding holder and the storage portion of the heat sink member.

A seventh aspect of the present invention is directed to the vehicle lighting device according to the sixth aspect, wherein:

the power-feeding holder includes a light source-side connector which is accommodated in a portion of the storage portion of the heat sink member, at an opposite side to a light radiation direction of the semiconductor-type light source, the connector being adapted to connect to the power source.

An eighth aspect of the present invention is directed to the vehicle lighting device according to the sixth aspect, wherein:

the power-feeding holder has a protrusion portion on a face opposite to the storage portion of the heat sink member; and the storage portion of the heat sink member includes:

a placement base on which the semiconductor-type light source is placed;

a positioning portion which is provided at least at one side around the placement base, for positioning the semiconductor-type light source placed on the placement base; and a recessed portion engaging with the protrusion portion of the power-feeding holder, for positioning the power-feeding holder and the storage portion of the heat sink member when the power-feeding holder holds the semiconductor-type light source in the storage portion of the heat sink member.

A ninth aspect of the present invention is directed to a vehicle lighting device, comprising:

(i) a heat sink member having a recessed storage portion;

(ii) a semiconductor-type light source for light radiation, which is placed in the storage portion of the heat sink member; and (iii) a light source fixing portion which is arranged in the storage portion of the heat sink member, for fixing the semiconductor-type light source in the storage portion of the heat sink member and connecting to a power source in order to feed a power current to the semiconductor-type light source fixed in the storage portion, wherein: the light source fixing portion includes:

a power-feeding holder which is set on an storage portion of the heat sink member and the semiconductor-type light source, the holder having an opening, the holder being adapted to expose from the opening the semiconductor-type light source placed in the storage portion of the heat sink member and to hold a base portion of the semiconductor-type light source at a side of the storage portion of the heat sink member by means of a peripheral edge of the opening; and an engagement portion engaging with the storage portion of the heat sink member, for fixing the power-feeding holder to the side of the storage portion of the heat sink member and sandwiching and fixing the semiconductor-type light source between the power-feeding holder and the storage portion of the heat sink member.

A tenth aspect of the present invention is directed to the vehicle lighting device according to the ninth aspect, wherein:

the engagement portion of the light source fixing portion is provided at a fixing member arranged on the power-feeding holder in a state in which the peripheral edge of the opening of the power-feeding holder holds the base portion of the semiconductor-type light source at the side of the storage portion of the heat sink member, in the storage portion of the heat sink member.

An eleventh aspect of the present invention is directed to the vehicle lighting device according to the ninth aspect, wherein:

the power-feeding holder includes a light source-side connector which is stored in a portion at an opposite side to a light radiation direction of the semiconductor-type light source in the storage portion of the heat sink member, the connector being adapted to connect to the power source.

The vehicle lighting device according to the first aspect of the present invention allows components made up of a heat sink member, a semiconductor-type light source, a power-feeding holder, and a fixing member to be assembled in one top-to-down direction by means for solving the above-described problems. In other words, the semiconductor-type light source is directly placed on a top face of the heat sink member from above; the power-feeding holder is set on the semiconductor-type light source and the heat sink member from above; the semiconductor-type light source is held at the heat sink member side, enabling power feeding to the semiconductor-type light source; the fixing member is adapted to cover the power-feeding holder from above, fixing the power-feeding holder to the heat sink member and sandwiching and fixing the semiconductor-type light source between the power-feeding holder and the heat-sink member. In this manner, the vehicle lighting device according to the first aspect of the present invention allows components made up of the heat sink member, the semiconductor-type light source, the power-feeding holder, and the fixing member to be assembled in one top-to-down direction, thus improving workability of assembling components and enabling automated assembling of components.

Further, in the vehicle lighting device according to the first aspect of the present invention, in a state in which the semiconductor-type light source is directly placed on a placement surface of the heat sink member, the power-feeding holder is fixed to the heat sink member by means of a fixing member and the semiconductor-type light source is sandwiched and fixed between the power-feeding holder and the heat sink member. As a result, in the vehicle lighting device according to the first aspect of the present invention, the semiconductor-type light source is in direct contact with the heat sink member, thus improving heat transmission from the semiconductor-type light source to the heat sink member and attaining a significant heat radiation effect of the semiconductor-type light source.

Moreover, in the vehicle lighting device according to the first aspect of the present invention, a light source-side connector and a power source-side connector of the power-feeding holder are positioned at an opposite side to the direction in which the light from the semiconductor-type light source is radiated, i.e., at the rear face side (rear side). Thus, dimensions in the longitudinal and transverse directions can be reduced in comparison with a lighting device in which the light source-side connector and the power source-side connector of the power-feeding holder are positioned at a plane side (upper side), a bottom face side (lower side), a left face side (left side), or a right face side (right side). Furthermore, the light source-side connector and the power source-side connector of the power-feeding holder become invisible when they are seen from a front face side (front side). For example, in a lighting device in which a lens is positioned at a front face side, the light source-side connector and the power source-side connector of the power-feeding holder are never seen with these connectors being moved to a lens, thus improving appearance or design properties. In addition, in comparison with a lighting device in which a light source-side connector and a power source-side connector of a power-feeding holder are positioned on a front side, radiation of the light from the semiconductor-type light source cannot be prevented, thus eliminating influence on light distribution.

In addition, in the vehicle lighting device according to the second aspect of the present invention, a light source-side connector is accommodated in an accommodation hole of a rear face member (such as a heat sink member, a lamp housing, or a bracket, for example). Thus, the vehicle lighting device according to the second aspect of the present invention is capable of accommodating the light source-side connector in the accommodation hole of the rear face member in a lighting device in which the rear face member is provided at an opposite side to the direction in which the light from the semiconductor-type light source is radiated, i.e., at the rear face side. Thus, dimensions of the rear face side can be reduced by a space saved by accommodating the light source-side connector in the accommodation hole of the rear face member. In this manner, in the vehicle lighting device according to the second aspect of the present invention, the dimensions of the rear face side can be reduced utilizing a space for the rear face member, the space being provided at the rear face side, and the lighting device can be downsized accordingly.

Further, in the vehicle lighting device according to the third aspect of the present invention, a lock hole in which a lock portion of a power source-side connector is to be locked is provided at a light source-side connector. Thus, a lock state between the lock hole of the light source-side connector and the lock portion of the power source-side connector can be checked through the lock hole; the lock hole of the light source-side connector and the lock portion of the power source-side connector can be securely locked; and assembling properties between the light source-connector and the power source-side connector are improved.

Further, in the vehicle lighting device according to the third aspect of the present invention, a ready-made connector for automobile can be used as a power source-side connector for electrically connecting to a light source-side connector of a power-feeding holder; and reliability of electrical connection between the light source-side connector and the power source-side connector is improved. Moreover, in the vehicle lighting device according to the third aspect of the present invention, by adjusting the lock hole of the light source-side connector, a lock state between the lock hole of the light source-side connector and the lock portion of the power source-side connector can be set in an unlock-disable state or can be set in an unlock-enable state, in accordance with a vehicle type.

Furthermore, in the vehicle lighting device according to the fourth aspect of the present invention, a heat sink member and a semiconductor-type light source can be positioned by means of a positioning portion, a spring portion, and a receptacle portion of the heat sink member. In addition, the heat sink member and the power-feeding holder can be positioned by means of the positioning portion of the heat sink member and the semiconductor-type light source. Further, the semiconductor-type light source and the power-feeding holder can be positioned via the heat sink member. As a result, in the vehicle lighting device according to the fourth aspect of the present invention, the heat sink member, the semiconductor-type light source, and the power-feeding holder can be mutually positioned with high precision. Moreover, the heat sink member, the semiconductor-type light source, and the power-feeding holder that were positioned with high precision are fixed by means of the fixing member, so that the light from the semiconductor-type light source can be controlled with high precision and light distribution can be controlled with high precision.

DESCRIPTION OF PREFERRED EMBODIMENTS

Figure 1:
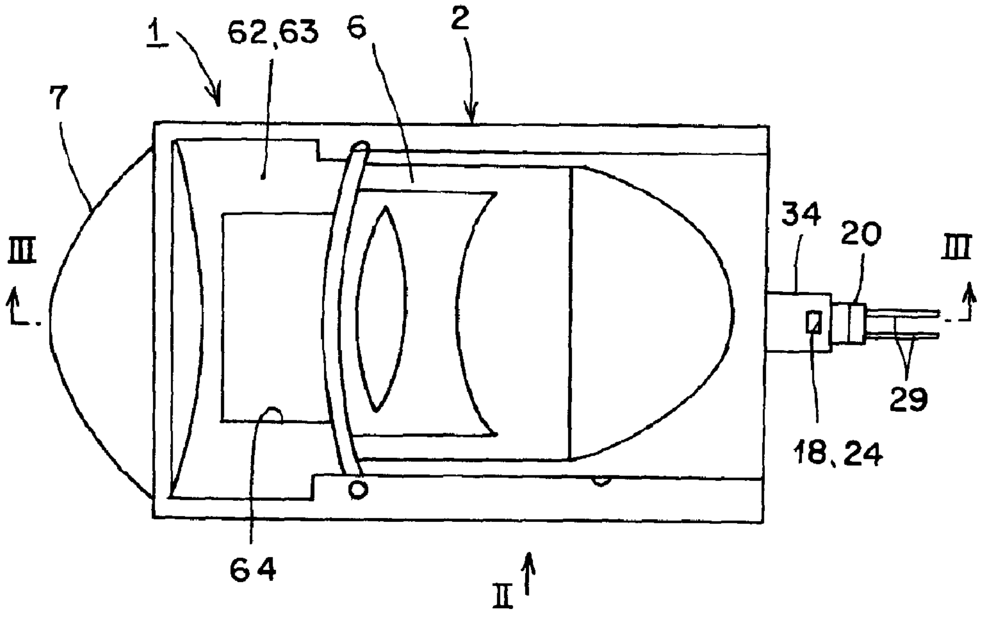
FIG. 1 is a plan view of a lamp unit showing an embodiment of a vehicle lighting device according to the present invention.

Hereinafter, an embodiment of the vehicle lighting device according to the present invention will be described in detail referring to the drawings. The present invention is not limited by the embodiment. In addition, in the specification and claims, a term "upper" designates "upper" in a gravitational direction at the time of assembling the vehicle lighting device according to the present invention. Further, in the specification and claims, terms "upper", "lower", "front", "rear", "left", and "right" designate "upper", "lower", "front", "rear", "left", and "right" of an automobile in a case where the vehicle lighting device according to the present invention is mounted on the automobile.

Embodiment(s)

Figure 2:
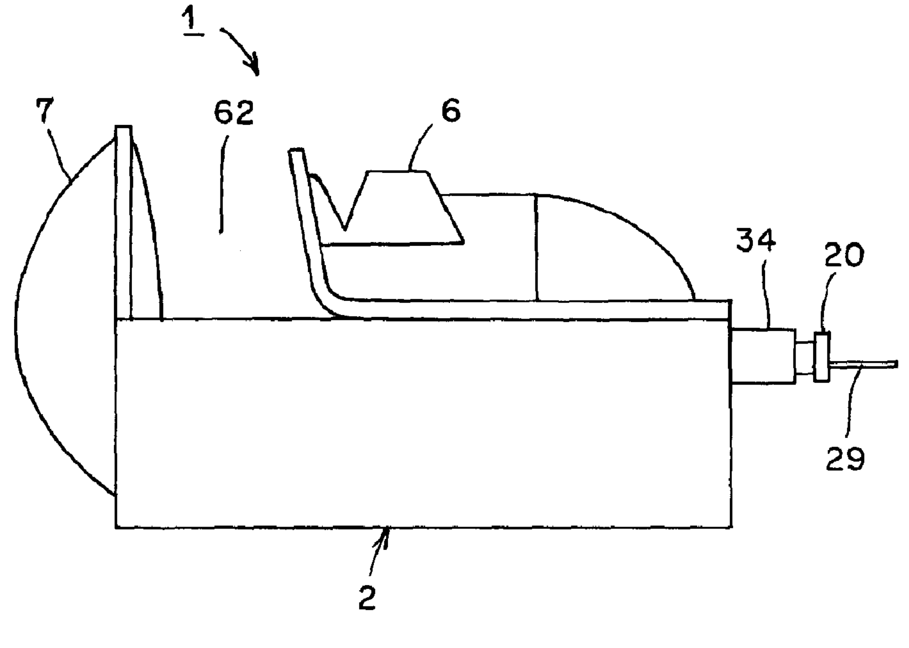
FIG. 2 is a view (side view) taken along the line II in FIG. 1, similarly.
Figure 3:
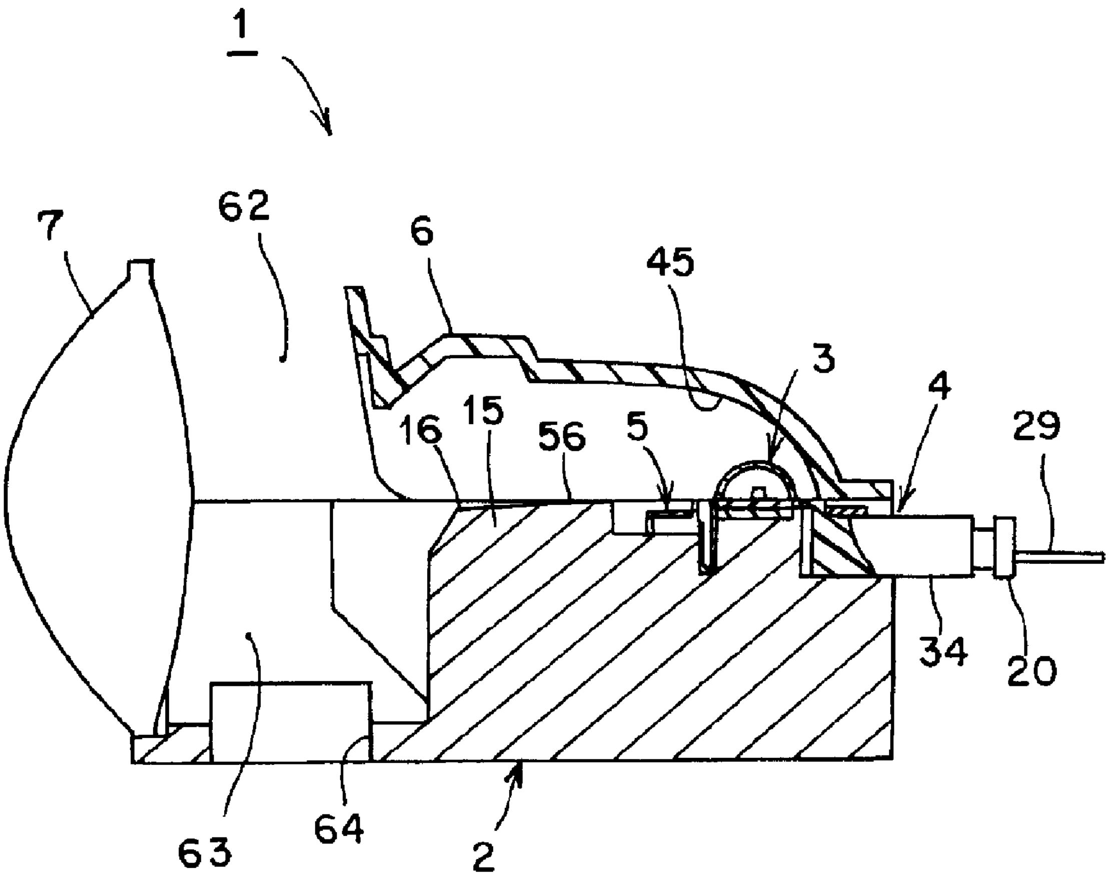
FIG. 3 is a cross-sectional view taken along the line III-III in FIG. 1, similarly.
Figure 4:
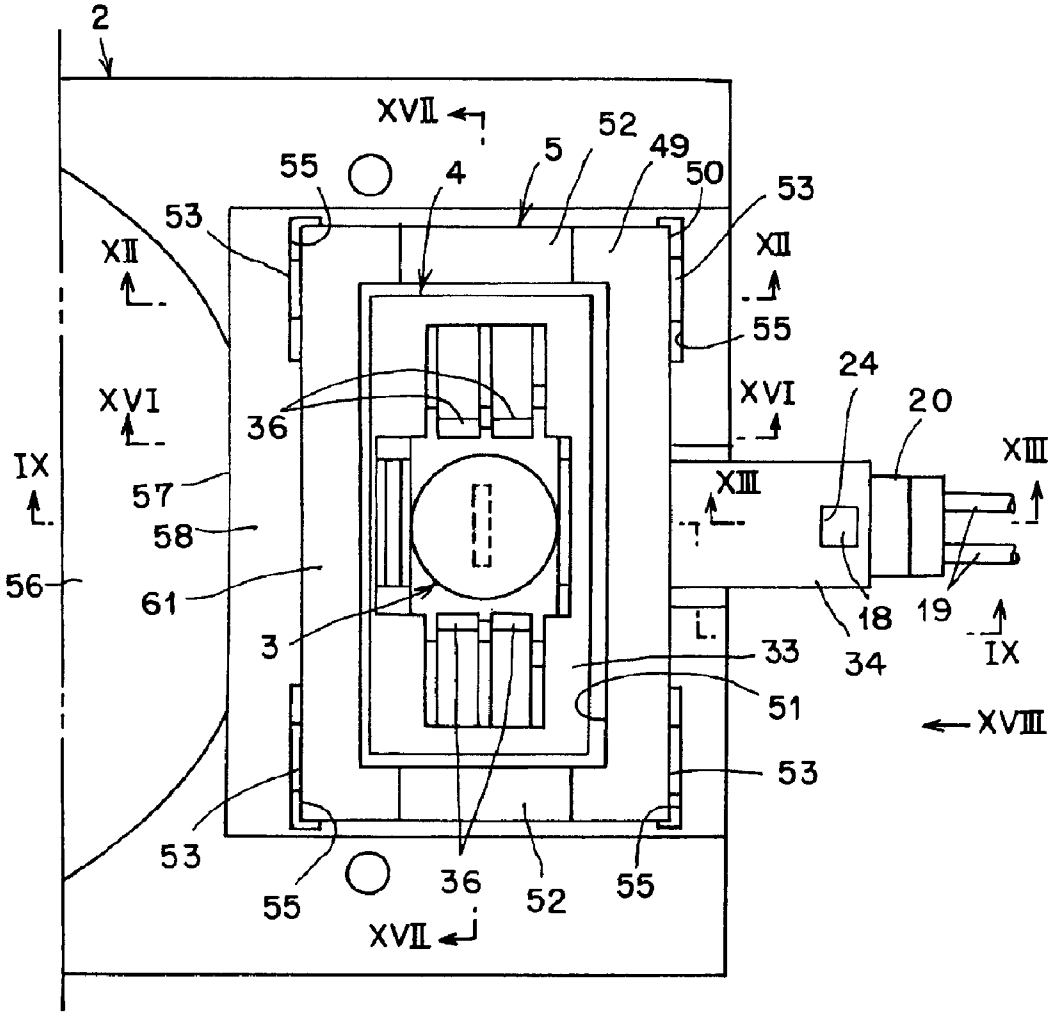
FIG. 4 is a partial plan view showing a state in which a fixing member is fixed on a heat sink member, a semiconductor-type light source, and a power-feeding holder, similarly.
Figure 5:
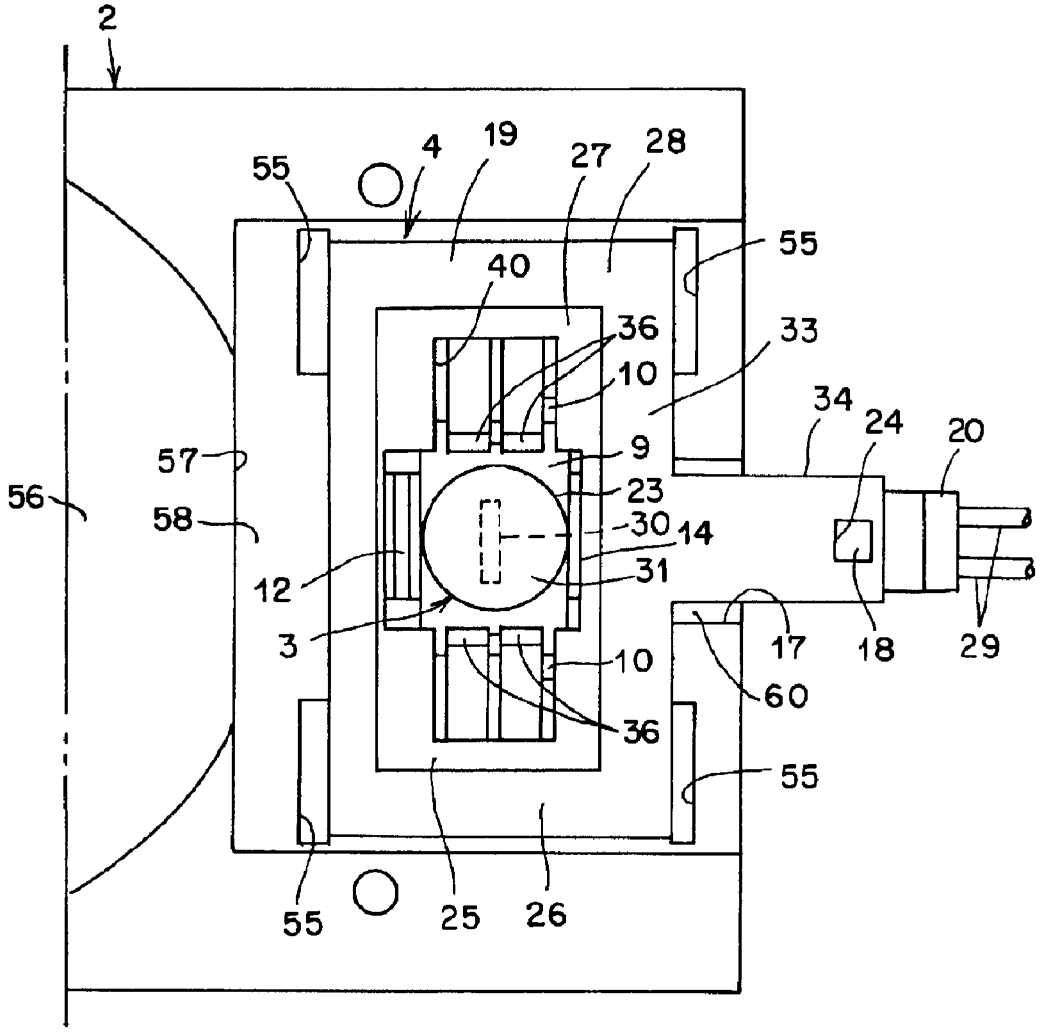
FIG. 5 is a partial plan view showing a state in which the power-feeding holder is set on the heat sink member and the semiconductor-type light source, similarly.

Hereinafter, a constitution of a vehicle lighting device in this embodiment will be described. In the figures, reference numeral 1 denotes a vehicle lighting device in this embodiment. The vehicle lighting device 1 is a headlamp for automobile, for example, and forms a projector-type unit structure. The vehicle lighting device 1, as shown in FIGS. 1 to 3, is made up of: a heat sink member 2; a semiconductor-type light source 3; a power-feeding holder 4; a fixing member 5; a reflector 6; a projecting lens 7; and a lamp housing and a lamp lens of headlamp for automobile, although not shown (such as a transparent outer lens, for example).

The heat sink member 2, the semiconductor-type light source 3, the power-feeding holder 4, the fixing member 5, the reflector 6, and the projecting lens 7 constitute a lamp unit. One or more of the lamp units are disposed in a lamp room partitioned by the lamp housing and the lamp lens of the headlamp for automobile, for example, via an optical-axis adjustment mechanism.

The heat sink member 2 is made of a material with a high thermal conductivity such as a resin or a metallic die cast, for example. In the heat sink member 2, as shown in FIG. 3, a front part forms a semi-cylindrical frame shape, and a rear part forms a rectangular-prism block shape. A top face 56 of the rear part in the block shape of the heat sink member 2 forms a substantially flat face and the lower part of the rear part in the block shape of the heat sink member 2 forms a fin shape. On the other hand, at the front part in the frame shape of the heat sink member 2, an upper half is open, and a lower half is closed in a semi-cylindrical shape. A window portion 64 is provided at the closed part of the front part in the frame shape of the heat sink member 2.

Figure 8:
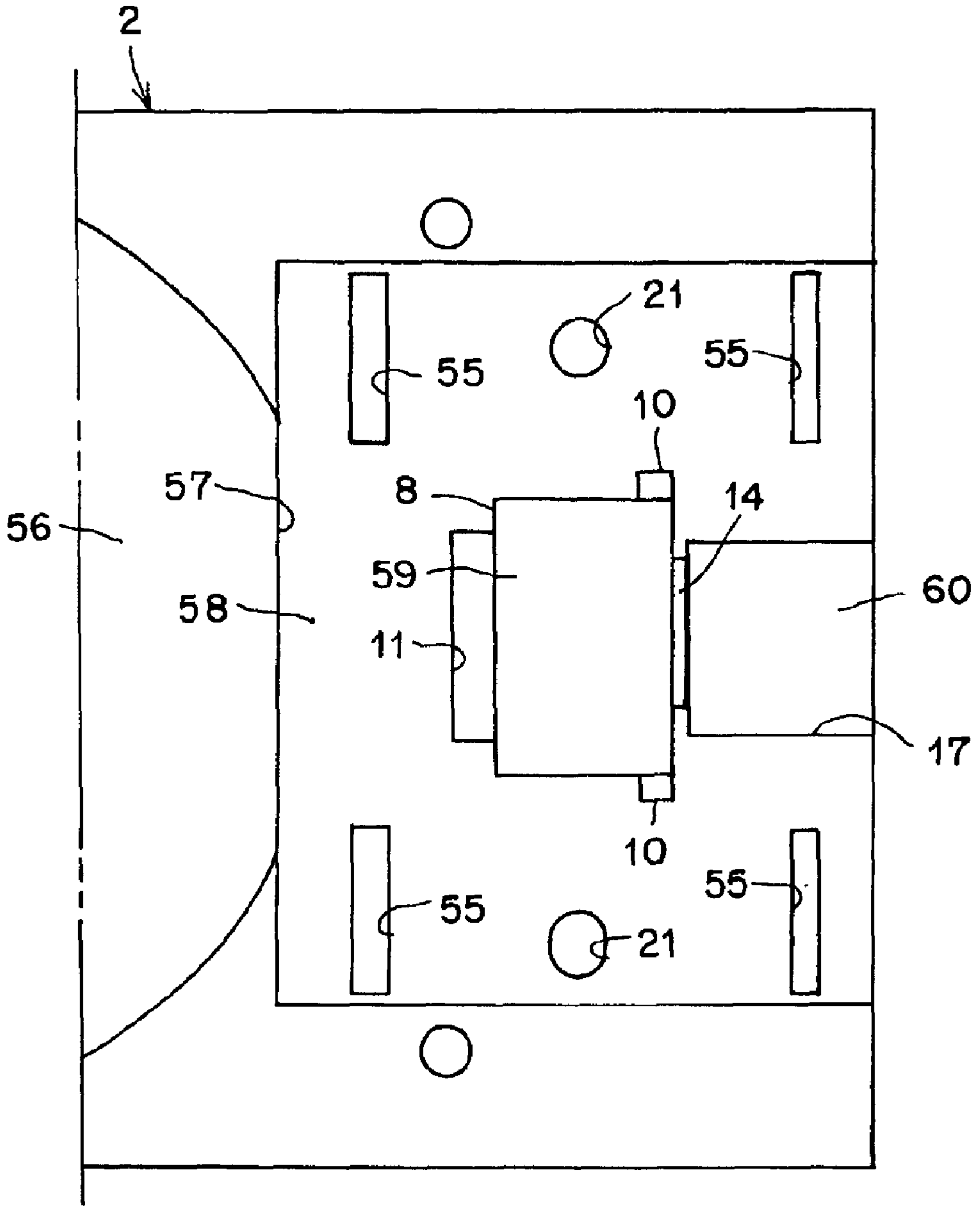
FIG. 8 is a partial plan view showing the placement base of the heat sink member and its periphery, similarly.
Figure 10:
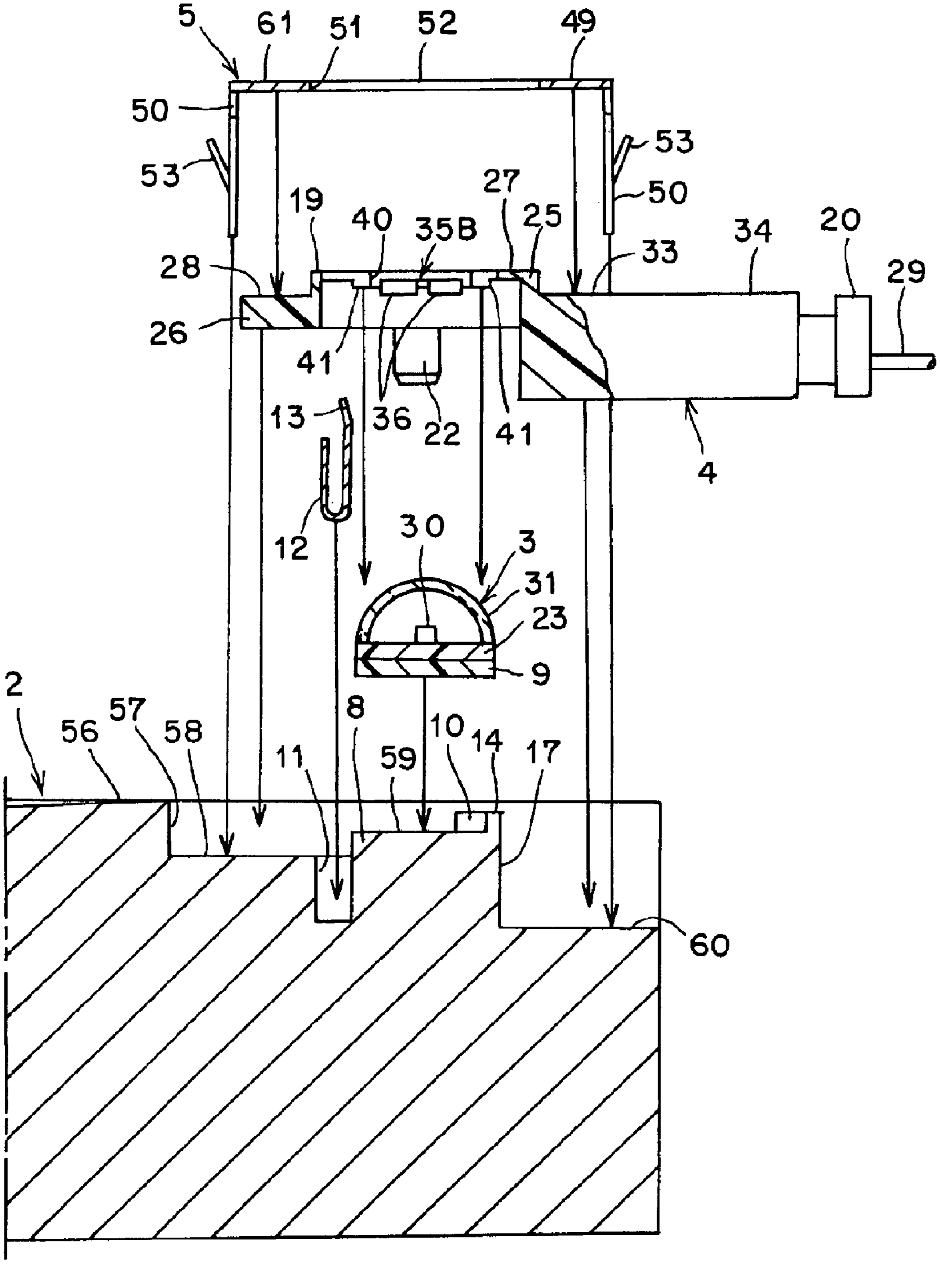
FIG. 10 is an exploded cross-sectional view showing a procedure for assembling components, similarly.
Figure 11:
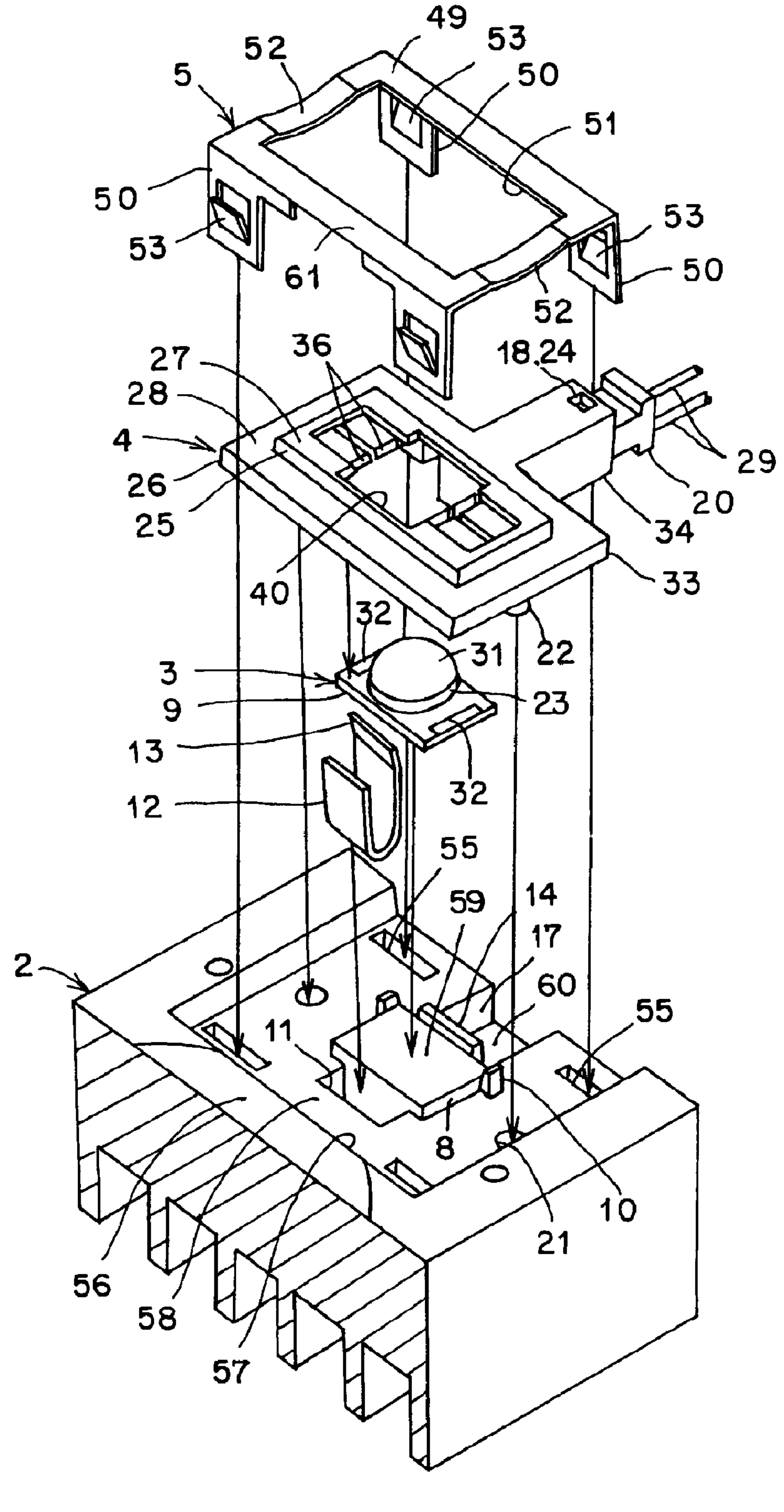
FIG. 11 is an exploded perspective view showing a procedure for assembling components, similarly.

As shown in FIGS. 8, 10, and 11, a rectangular accommodation recessed portion 57 is provided at a posterior half of the top face 56 of the rear part in the block shape of the heat sink member 2. A top face 58 of the accommodation recessed portion 57 forms a flat face and is lower than the top face 56 of the rear part in the block shape of the heat sink member 2 by one step.

A rectangular placement base 8 is integrally provided at the center of the top face 58 of the accommodation recessed portion 57 of the heat sink member 2. The top face 59 of the placement base 8 forms a flat face; is lower than the top face 56 of the rear part in the block shape of the heat sink member 2 by one step; and is upper than the top face 58 of the accommodation recessed portion by one step. The placement base 8 forms a rectangle which is substantially identical to a rectangular board 9 of the semiconductor-type light source 3, and the board 9 of the semiconductor-type light source 3 is directly placed from above. The placement base 8 may not be provided. In this case, the top face 58 of the accommodation recessed portion 57 serves as a placement face.

Of the top face 58 of the accommodation recessed portion 57 of the heat sink member 2, two square-pole shaped positioning portions (stoppers) 10, 10 are integrally provided, respectively, at both the rear left and right sides of the placement base 8. The positioning portions 10, 10 determine a position of the semiconductor-type light source 3, and determine one direction on the top face 59 of the placement base 8 of the semiconductor-type light source 3, i.e., a position in the leftward and rightward directions. The two positioning portions 10, 10 are opposed to each other on one side face of a flat face and are spaced by a distance corresponding to a long side of the board 9 of the semiconductor-type light source 3. The two positioning portions 10, 10, as shown in FIG. 11, have inclined faces at their opposite upper end parts so that the semiconductor-type light source 3 can be easily placed on the placement base 8 of the heat sink member 2.

Figure 9:
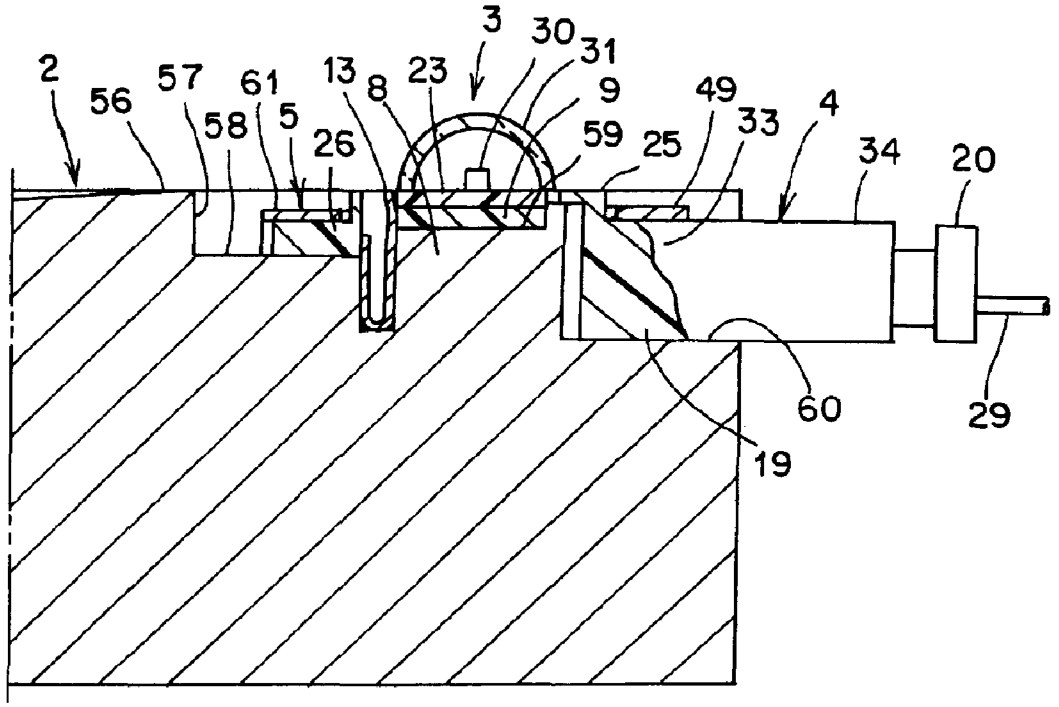
FIG. 9 is a cross-sectional view taken along the line IX-IX in FIG. 4, similarly.

Of the top face 58 of the accommodation recessed portion 57 of the heat sink member 2, an elongated rectangular storage groove 11 is provided at a center part of a front side of the placement base 8. As shown in FIGS. 9 to 11, a spring portion 12 as a U-shaped spring is pressed in the storage groove 11 from above. At the spring portion 12, an elastic force acts in a direction crossing on the top face 59 of the placement base 8 with respect to a positioning direction (transverse direction) of the positioning portions 10, 10, i.e., in a longitudinal direction. At the spring portion 12, a length of a perpendicular portion of a rear side is greater than that of a perpendicular portion of a front side, and an upper end part 13 of the perpendicular portion of the rear side protrudes upwardly from the top face 59 of the placement base 8 of the heat sink member 2. The upper end part 13 of the perpendicular portion of the rear side is slightly inclined to the front side, and is constituted so that the semiconductor-type light source 3 can be easily placed on the placement base 8 of the heat sink member 2.

Of the top face 58 of the accommodation recessed portion 57 of the heat sink member 2, an elongated square-pole shaped receptacle portion (stopper) 14 is integrally provided at a center part of a rear side of the placement base 8. The receptacle portion 14 is opposed to the spring portion 12 while the semiconductor-type light source 3 is sandwiched in a direction in which the elastic force of the spring portion 12 acts, i.e., in a backward direction, and receives the board 9 of the semiconductor-type light source 3 being held by the elastic force of the spring portion 12. The receptacle portion 14, as shown in FIG. 11, forms an inclined face at an upper end part of a front side, and is constituted so that the semiconductor-type light source 3 is easily placed on the placement base 8 of the heat sink member 2.

As shown in FIG. 3, a shade 15 is integrally provided at an upper end part of an anterior half of a rear part in the block shape of the heat sink member 2. An edge 16 for forming a cutoff line (not shown) of a light distribution pattern (not shown) is provided at the shade 15. The edge 16 is provided on a boundary between a front part in the frame shape and a rear part in the block shape of the heat sink member 2. The top face 56 of the rear part in the block shape of the heat sink member 2 is also a top face of the shade 15.

Of the accommodation recessed portion 57 of the heat sink member 2, a recessed storage portion 17 is provided at a portion of a rear side with respect to the receptacle portion 14. A top face 60 of the storage portion 17 is lower than the top face 58 of the accommodation recessed portion 57 by one step. The storage portion 17 stores at least a light source-side connector 34 of the power-feeding holder 4.

Of the top face 58 of the accommodation recessed portion 57 of the heat sink member 2, circular recessed portions 21, 21 are provided, respectively, in locations slightly distant from the center parts at both the left and right sides of the placement base 8. The circular recessed portions 21, 21 determine mutual locations between the heat sink member 2 and the power-feeding holder 4, together with the circular protrusion portions 22, 22 of the power-feeding holder 4. As illustrated, either of respective ones of the two circular recessed portions 21, 21 and the two circular protrusion portions 22, 22 may be formed in an elliptical shape or both of them may be formed in a circular shape.

Figure 12:
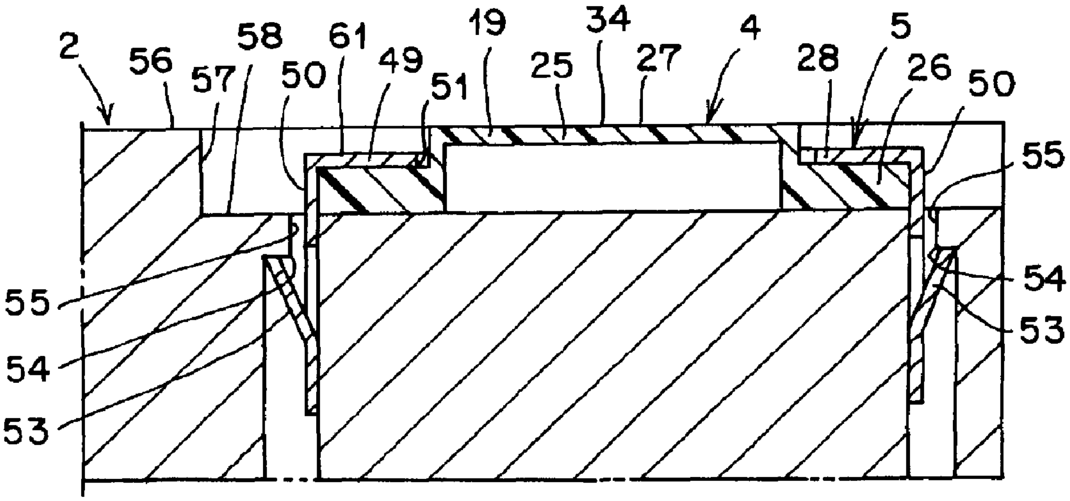
FIG. 12 is a cross-sectional view taken along the line XII-XII in FIG. 4.

Of the accommodation recessed portion 57 of the heat sink member 2, at a portion equivalent to an external side face of the power-feeding fixing portion 33 of the power-feeding holder 4 accommodated and set in a state in which it is positioned by the positioning portion (the circular recessed portions 21, 21 and the circular protrusion portions 22, 22) in the accommodation recessed portion 57, an insert hole 55 is provided for inserting four vertical plate portions 50 of the fixing member 5. As shown in FIG. 12, an engagement portion 54 formed in a stepped shape is provided on a wall face in the middle of the insert hole 55.

As the semiconductor-type light source 3, for example, a self-luminous semiconductor-type light source such as an LED or an EL (an organic EL) (an LED in the embodiment) is used. The semiconductor-type light source 3, as shown in FIGS. 3 to 7 and 9 to 11, is made up of: a board 9 shaped like a rectangular plate; a circular plate-shaped base 23 fixed to one face (top face) of the board 9; a light emitter 30 of a light source chip (semiconductor chip) shaped like a very small rectangular-prism, fixed to one face (top face) of the base 23; a light transmitting member (lens) 31 formed in a hemispheric shape (dome shape), covering the light emitter 30 and the base 23; and electrically conductive members 32, 32 provided, respectively, at two sides opposite to each other on one face (top face) of the board 9, i.e., at the centers at both the left and right end parts. The light emitter 30 of the semiconductor-type light source 3, as shown in FIG. 9, is positioned on a face which is substantially identical to the top face 56 of the heat sink member 2.

The power-feeding holder 4, as shown in FIGS. 3 to 6 and 9 to 19, is set on the heat sink member 2 and the semiconductor-type light source 3, and is made of a power-feeding fixing portion 33 and a light source-side connector 34. The power-feeding fixing portion 33 of the power-feeding holder 4 is of size to an extent such that the fixing portion is placed on the most portion of a middle excluding a front side part and a rear side part of the top face 58 of the accommodation recessed portion 57 of the heat sink member 2 and is of size to an extent such that the placement base 8, the positioning portions 10, 10, the storage groove 11, the receptacle portion 14, and the circular recessed portions 21, 21 can be covered and the insert hole 55 is not covered. On the other hand, the light source side connector 34 of the power-feeding holder 4 is of size to an extent such that the connector is stored in the storage portion 17 of the heat sink member 2.

The power-feeding fixing portion 33 of the power-feeding holder 4 holds the semiconductor-type light source 3 at the side of the heat sink member 2 and feeds a power current to the semiconductor-type light source 3. In addition, the power-feeding fixing portion 33 of the power-feeding holder 4 is accommodated in the accommodation recessed portion 57 of the heat sink member 2. On the other hand, the light source-side connector 34 of the power-feeding holder 4 is integrally provided at a portion of the power-feeding fixing portion 33, at an opposite side (rear side) to a direction (forward direction) in which the light from the semiconductor-type light source 3 is radiated, and electrically connects to the power source-side connector 20. Further, the light source-side connector 34 of the power-feeding holder 4 is stored in the storage portion 17 of the heat sink member 2. A rectangular lock hole 24 in which a lock portion 18 of the power source-side connector 20 is to be locked is provided at the light source-side connector 34. Further, a plug-in hole 44 in which the power source-side connector 20 is to be plugged-in is provided at the light source-side connector 34.

Figure 6:
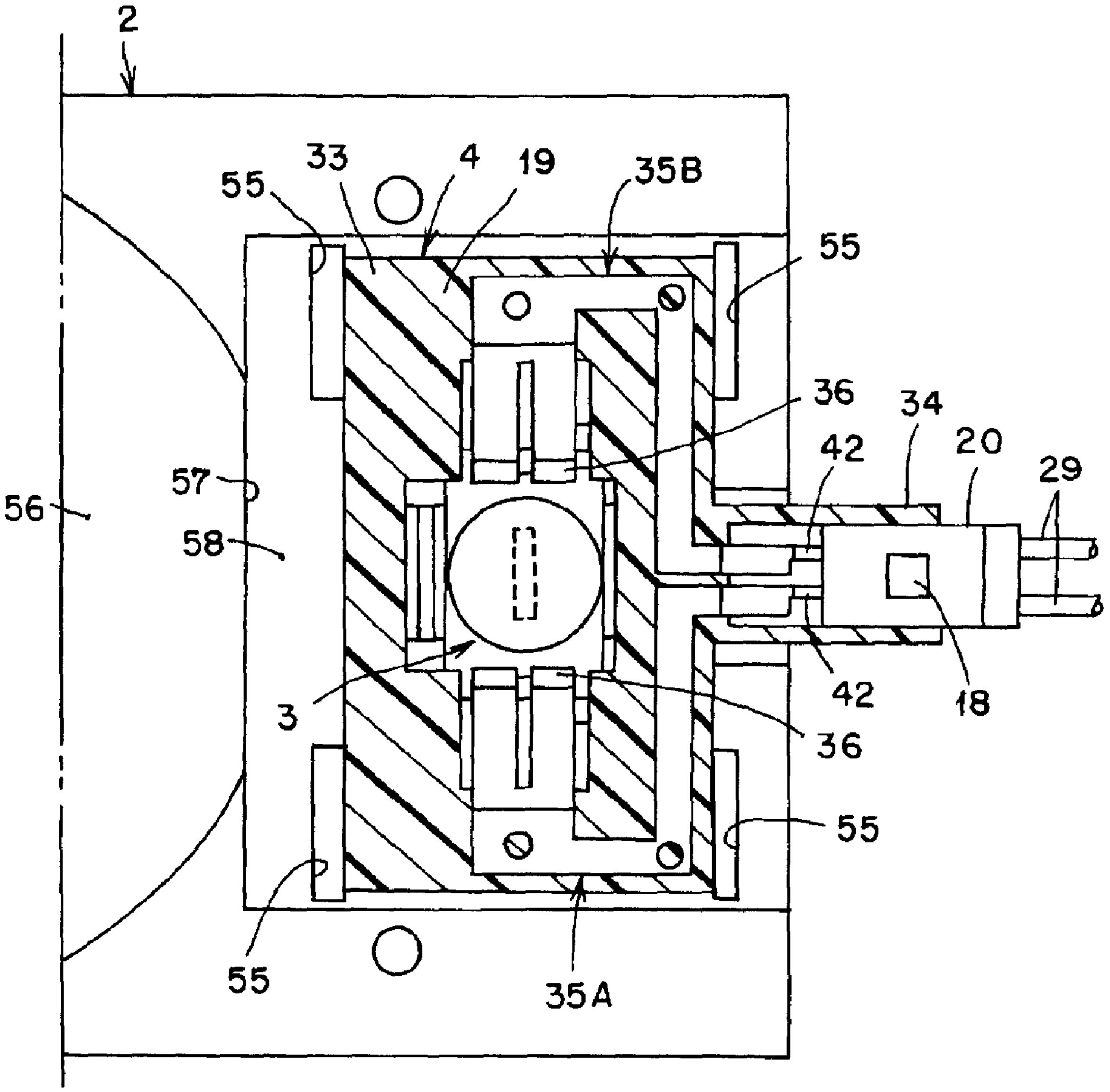
FIG. 6 is a partial plan view showing a connector portion and a contact portion of a contact by fragmentally showing a part of a housing of the power-feeding holder set on the heat sink member and the semiconductor-type light source, similarly.
Figure 7:
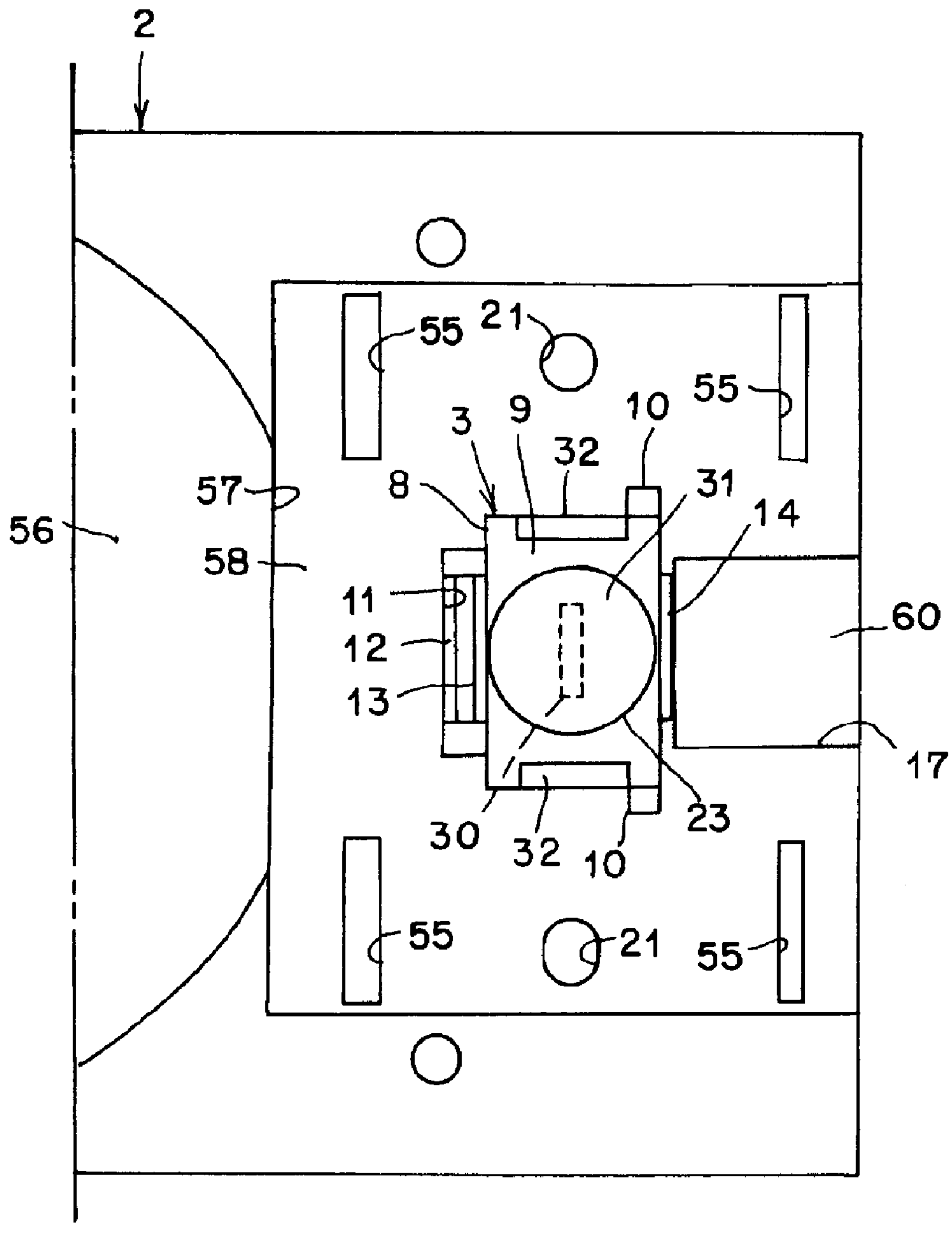
FIG. 7 is a partial plan view showing a state in which the semiconductor-type light source is directly placed on a placement base of the heat sink member, similarly.
Figure 19:
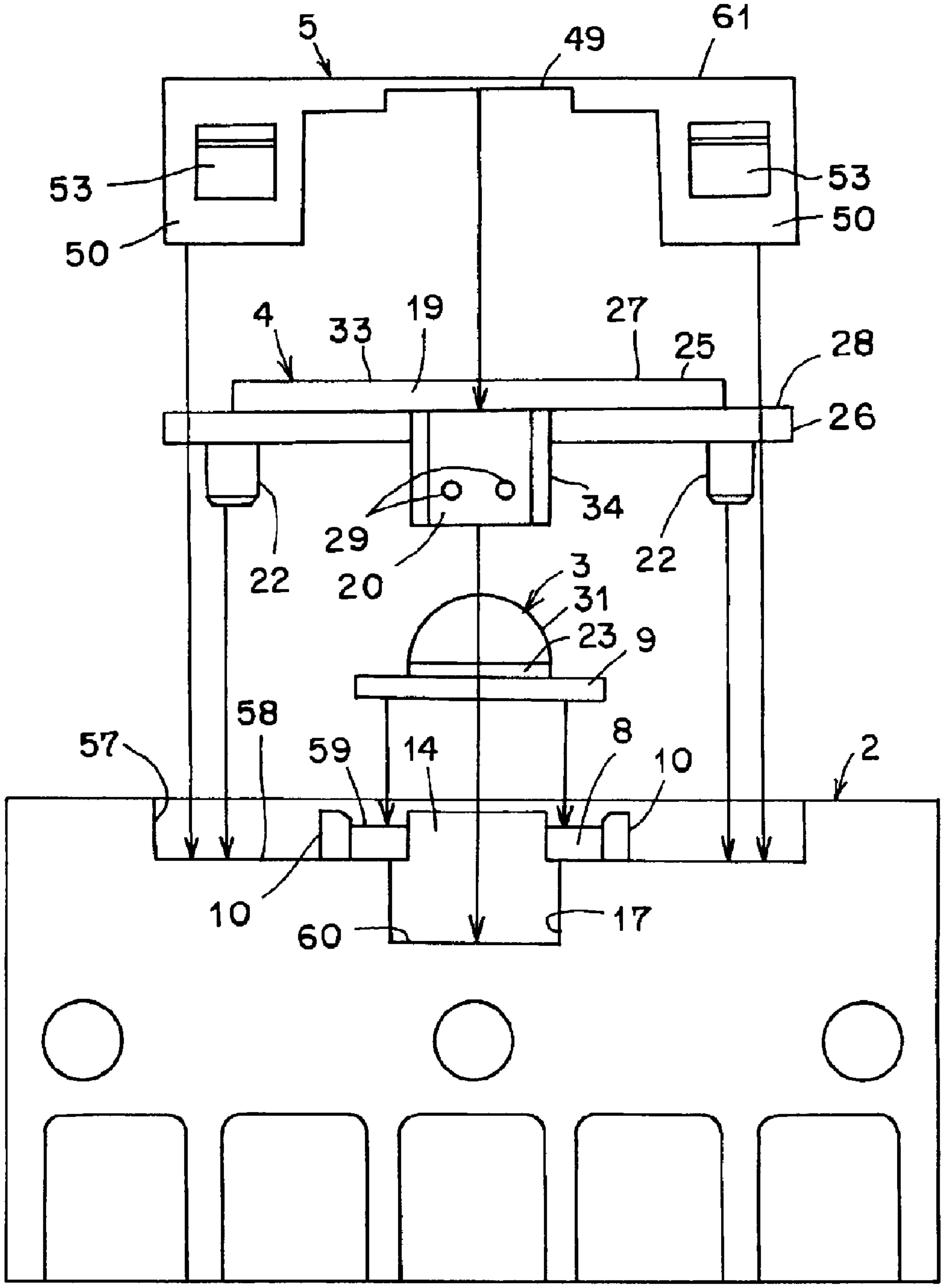
FIG. 19 is an exploded rear view showing a procedure for assembling components, similarly.
Figure 20:
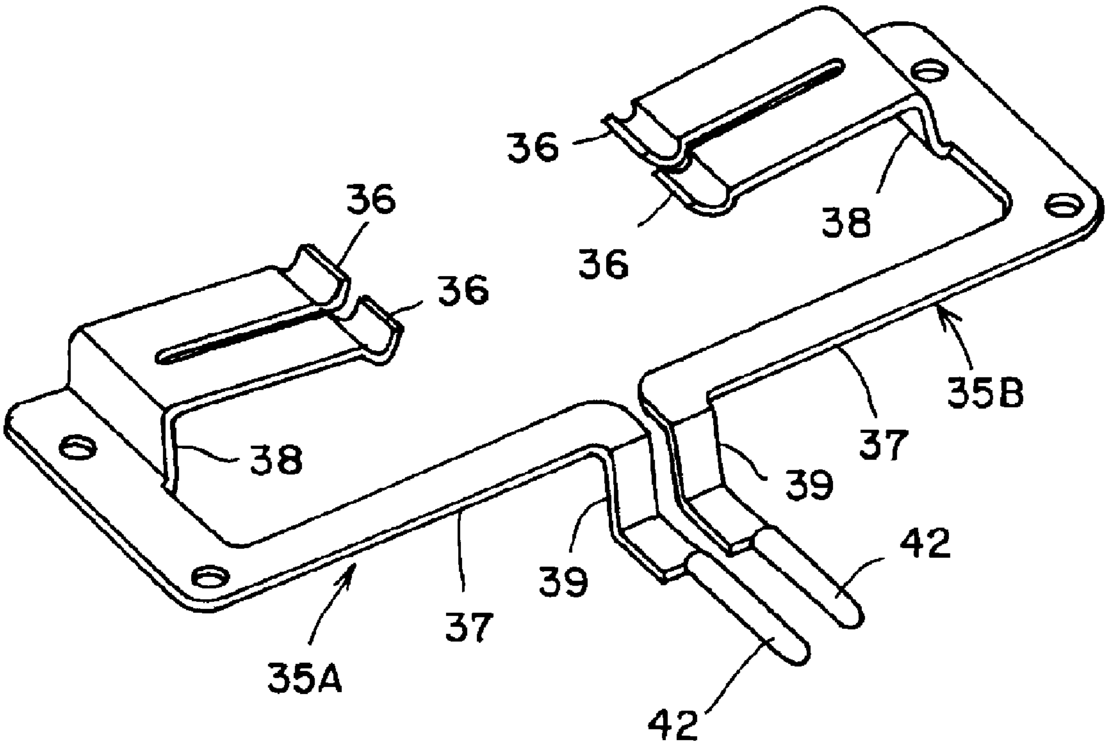
FIG. 20 is a perspective view showing the contact of the power-feeding holder, similarly.

Further, the power-feeding holder 4 is made up of: two contacts 35A, 35B of electrically conductive members having elasticity, which are in electrical contact with the electrically conductive members 32, 32 of the semiconductor-type light source 3; and a housing 19 of an insulation member for retaining the two contacts 35A, 35B in the states shown in FIGS. 6 and 19, and sandwiching and fixing the board 9 between the housing 19 and the placement base 8 of the heat sink member 2. The two contacts 35A, 35B are integrally molded (insert-molded) in the housing 19 in the states shown in FIGS. 6 and 19. Alternatively, these contacts are sandwiched between a top and a bottom formed by dividing the housing 19 in a horizontal direction. The two contacts 35A, 35B are made of a positive-side contact 35A and a negative-side contact 35B.

The housing 19 of the power-feeding fixing portion 33 of the power-feeding holder 4 is made up of a center part 25 and a peripheral edge part 26 made of upper and lower two-stepped layers. A top face 27 of the center part 25 is positioned lower than a top face 56 of the heat sink member 2. Alternatively, the top face 27 of the center part 25 is positioned in a location which is substantially identical to the top face 56 of the heat sink member 2 in height. A top face 28 of the peripheral edge part 26 is positioned lower than the top face 27 of the center part 25. A top face of the light source-side connector 34 of the power-feeding holder 4 is positioned in a location which is substantially identical to the top face 28 of the peripheral edge part 26 in height. In addition, a bottom face of the light source-side connector 34 of the power-feeding holder 4 is lower than the bottom face of the power-feeding fixing portion 33 by one step.

Figure 15A:
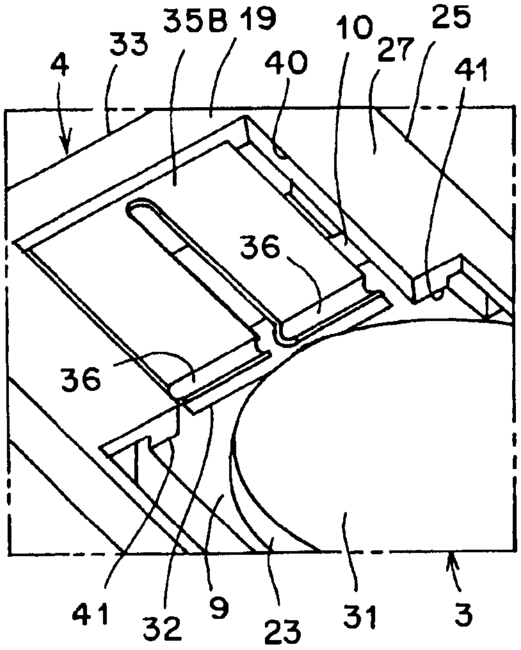
FIGS. 15A and 15B are partial perspective views each showing a holding state of a holding protrusion portion of the power-feeding holder and a connection state of a connecting portion, similarly.
Figure 15B:
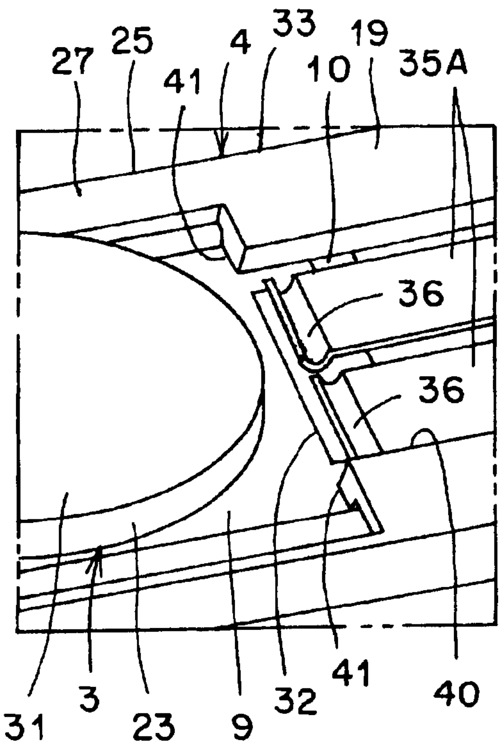
Figure 16:
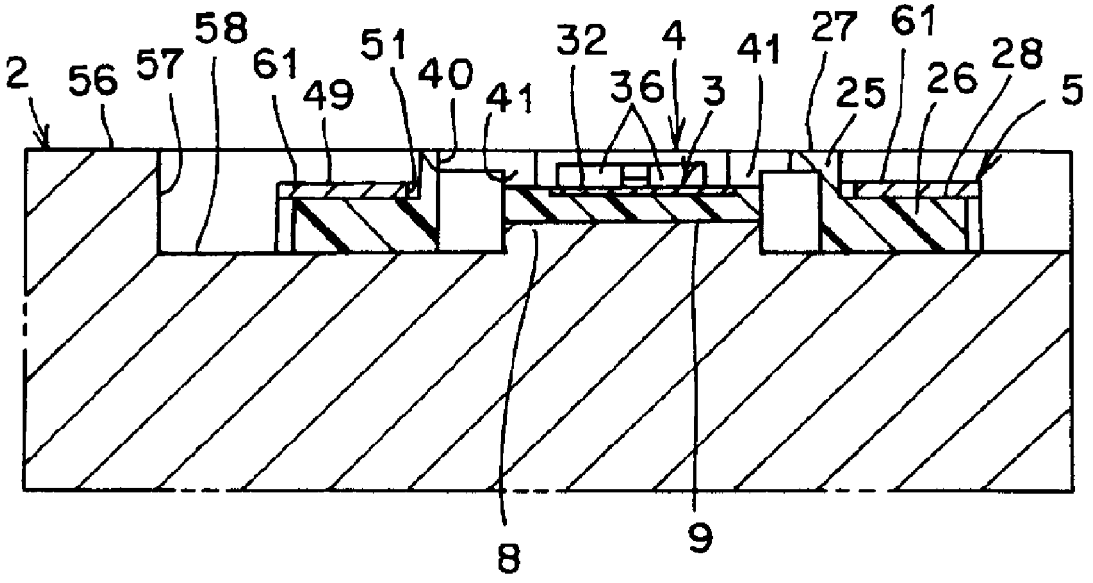
FIG. 16 is a cross-sectional view taken along the line XVI-XVI in FIG. 4, similarly.
Figure 17:
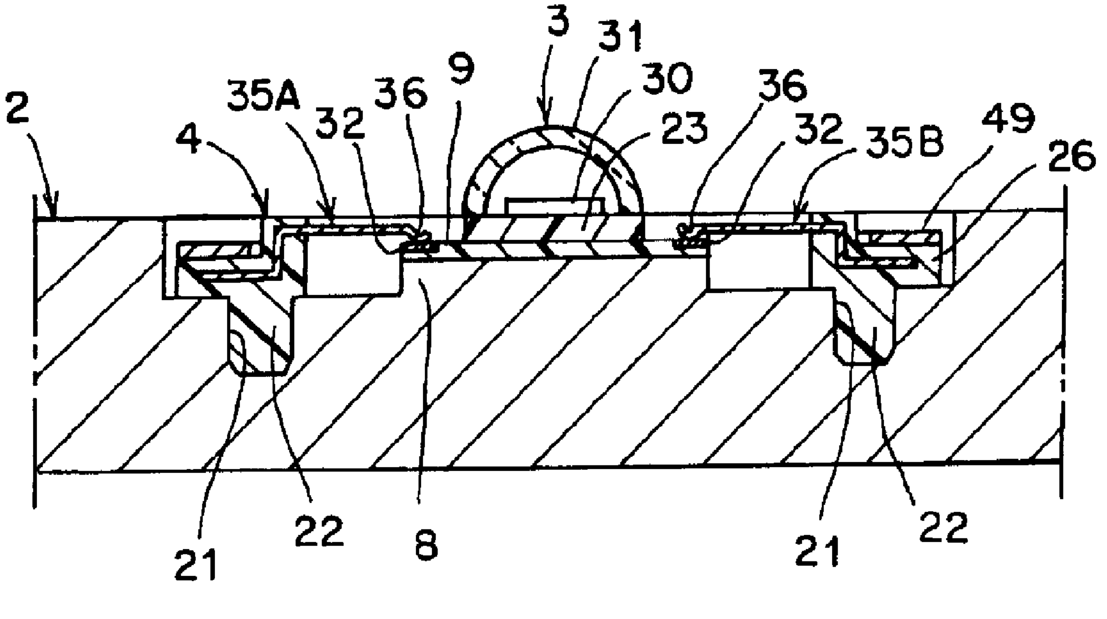
FIG. 17 is a cross-sectional view taken along the line XVII-XVII in FIG. 4, similarly.
Figure 18:
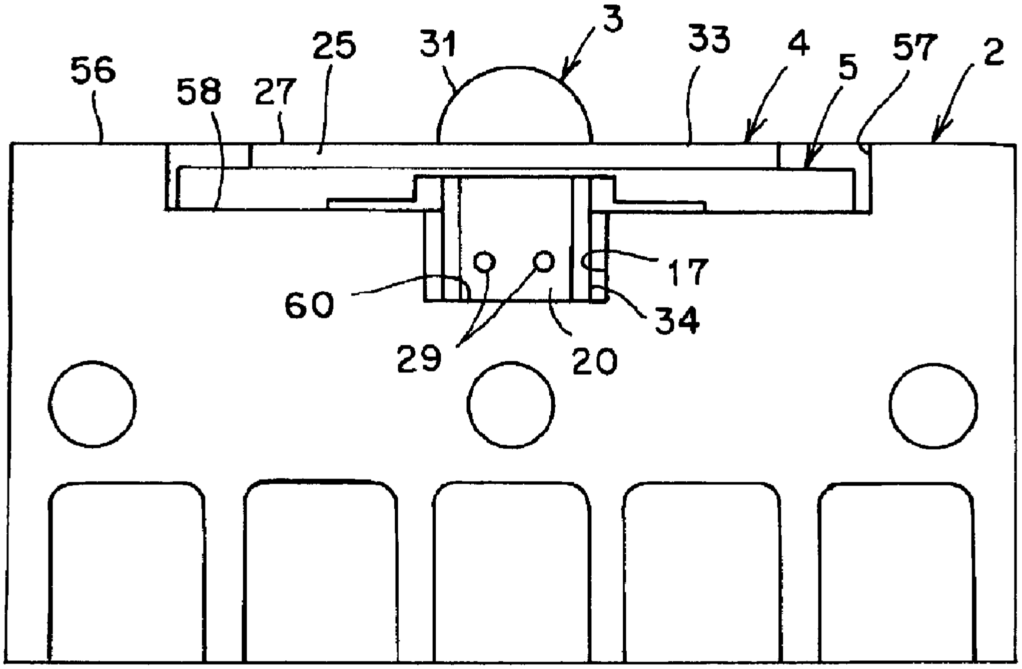
FIG. 18 is a fragmentary view taken along the line XVIII in FIG. 4, similarly.

As shown in FIGS. 15A and 15B, an opening 40 at which the semiconductor-type light source 3 is to be positioned is provided at the center part 25 of the housing 19 of the power-feeding fixing portion 33 of the power-feeding holder 4. At an edge of the opening 40, connecting portions 36, 36, 36, 36 of the two contacts 35A, 35B, for elastically electrically connecting to the electrically conductive members 32, 32 of the semiconductor-type light source 3, are provided in a protrusive manner in a location lower than the top face 56 of the heat sink member 2. In addition, at an edge of the opening 40, a holding protrusion portion 41, 41, 41, 41 are provided for holding the board 9 of the semiconductor-type light source 3 at the side of the placement base 8 of the heat sink member 2, in a location lower than the top face 56 of the heat sink member 2.

On a bottom face of the power-feeding fixing portion 33 of the power-feeding holder 4, i.e., on a face opposite to the top face 58 of the accommodation recessed portion 57 of the heat sink member 2, two circular protrusion portions 22, 22 as positioning portions are provided in correspondence with the two circular recessed portions 21, 21 of the heat sink member 2.

The two contacts 35A, 35B, as shown in FIGS. 6, 13, 14, 19, are made of: connecting portions 36, 36, 36, 36, every two of which are in electrical contact with the electrically conductive members 32, 32 of the semiconductor-type light source 3 in a vertical direction (from top to bottom); male terminal portions 42, 42 for electrically connecting to the power source-side connector 20 in a horizontal direction (longitudinal direction); and connection wiring portions 37, 37, 38, 38, 39, 39 for electrically connecting and wiring the connecting portions 36, 36, 36, 36 and the male terminal portions 42, 42, all of which are disposed in a horizontal direction.

The connection wiring portion is made of: horizontal plate portions 37, 37; vertical plate portions 38, 38 between the horizontal plate portions 37, 37 and the connecting portions 36, 36, 36, 36; and vertical plate portions 39, 39 between the horizontal plate portions 37, 37 and the male terminal portions 42, 42. As shown in FIGS. 6 and 19, circular through holes are provided at the horizontal plate portions 37, 37. When the power-feeding holder 4 is insert-molded in the circular through hole, a part of a resin of the housing 19 is inserted into the circular through hole, and the housing 19 and the two contacts 35A, 35B are securely fixed to each other.

The connecting portions 36, 36, 36, 36 are formed by bending a tip end part of a bifurcated horizontal plate portion in a V-shape or U-shape. The bifurcated horizontal plate portion has elasticity. The connecting portions 36, 36, 36, 36 of the two contacts 35A, 35B protrude from the edge of the opening 40 of the power-feeding fixing portion 33 and are opposite to each other. The connecting portions 36, 36, 36, 36 are in electrical elastic contact with the electrically conductive members 32, 32 of the board 9 of the semiconductor-type light source 3 from above, feed a power current to the semiconductor-type light source 3, and elastically compresses the board 9 of the semiconductor-type light source 3 against the side of the placement base 8 of the heat sink member 2.

On the other hand, the male terminal portions 42, 42 of the two contacts 35A, 35B protrude in the plug-in hole 44 of the light source-side connector 34. The male terminal portions 42, 42 removably and electrically connect to the female terminal portions 43, 43 of the power source-side connector 20.

Figure 13A:
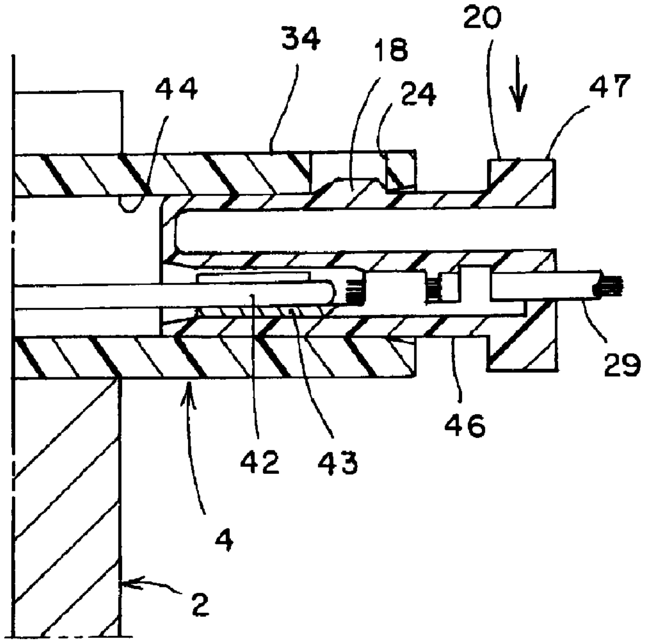
FIGS. 13A and 13B are cross-sectional views each taken along the line XIII-XIII in FIG. 4, showing a state of connection and a state of disconnection between a light source-side connector and a power source-side connector, of the power-feeding holder, similarly.
Figure 13B:
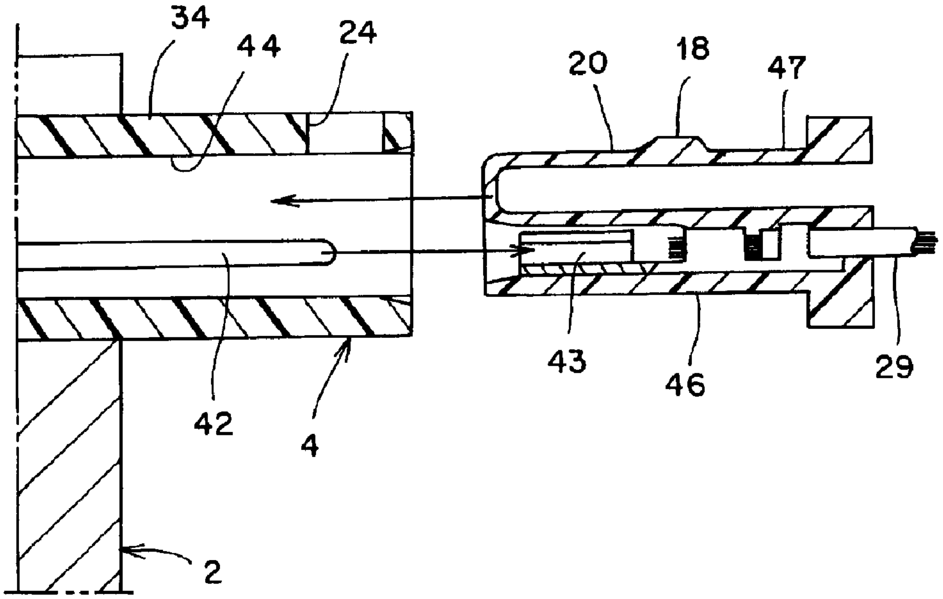

As the power source-side connector 20, for example, a ready-made connector for automobile is used. The power source-side connector 20, as shown in FIGS. 13A and 13B, is made up of: the harnesses 29, 29 electrically connected to a power source side; the female terminal portions 43, 43 for electrically connecting and fixing the harnesses 29, 29 by means of swaging or the like; and a casing 46 for integrally molding (insert-molding) the harnesses 29, 29 and the female terminal portions 43, 43. An elastic portion 47 is integrally provided at the casing 46. The lock portion 18 is integrally provided at the elastic portion 47.

FIG. 13A is a longitudinal cross-sectional view showing a state in which the light source-side connector 34 and the power source-side connector 20 are connected to each other. FIG. 13B is a longitudinal cross-sectional view showing a state in which the light source-side connector 34 and the power source-side connector 20 are disconnected from each other. As shown in FIG. 13B, the casing 46 of the power source-side connector 20 is plugged in the plug-in hole 44 of the light source-side connector 34 of the power-feeding holder 4, and the lock portion 18 of the power source-side connector 20 is locked in the lock hole 24 of the light source-side connector 34 of the power-feeding holder 4, whereby the male terminal portions 42, 42 of the light source-side connector 34 of the power-feeding holder 4 and the female terminal portions 43, 43 of the power source-side connector 2 electrically connect to each other. In addition, as shown in FIG. 13A, the elastic portion 47 of the power source-side connector 20 is pushed down to the direction indicated by the solid-line arrow; a lock state between the lock hole 24 of the light source-side connector 34 and the lock portion 18 of the power source-side connector 20 is released; and the casing 46 of the power source-side connector 20 is pulled out from the inside of the plug-in hole 44 of the light source-side connector 34, whereby electrical connection between the male terminal portions 42, 42 of the light source-side connector 34 and the female terminal portions 43, 43 of the power source-side connector 20 can be released. By adjusting the lock hole 24 of the light source-side connector 34, the lock state between the lock hole 24 of the light source-side connector 34 and the lock portion 18 of the power source-side connector 20 can be set in an unlock-disable state, in accordance with a vehicle type.

Figure 14:
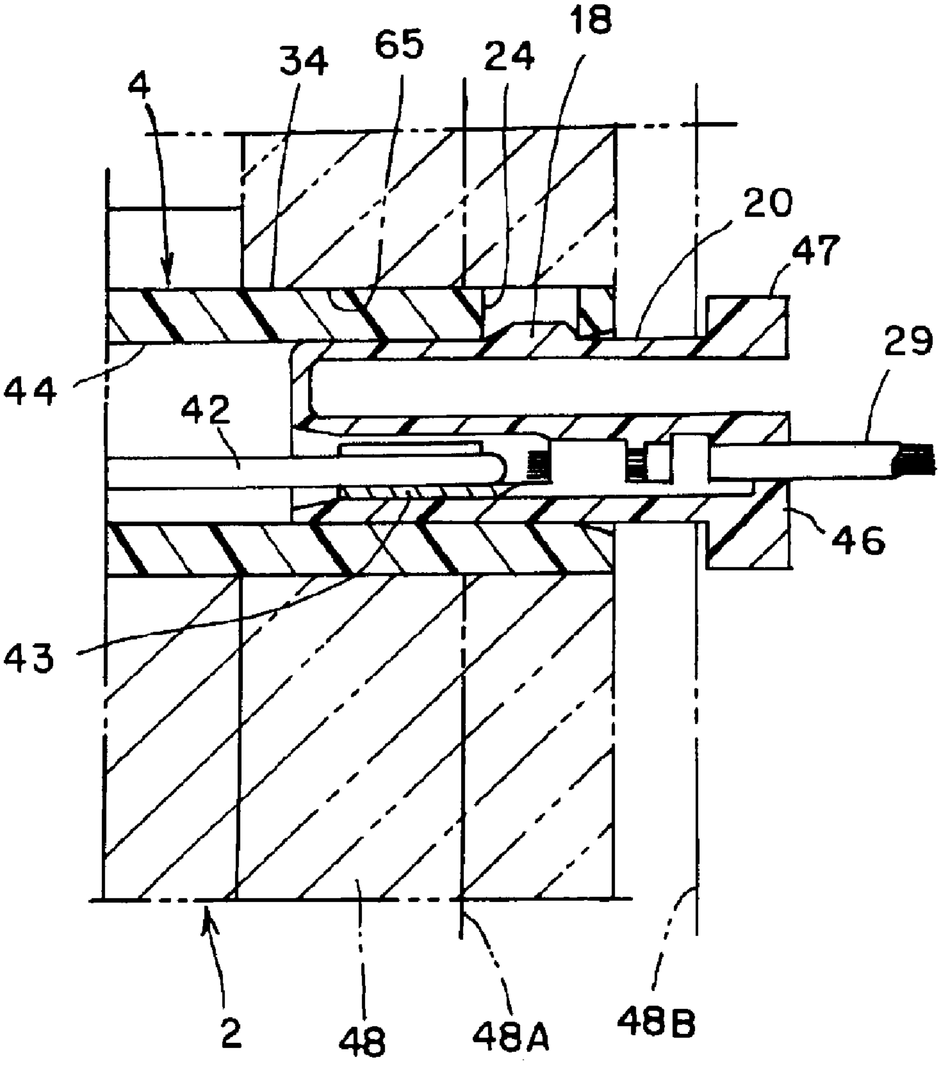
FIG. 14 is a partial cross-sectional view showing a state of connection between the light source-side connector and the power source-side connector, of the power-feeding holder in the vehicle lighting device having a rear face member, similarly.

As shown in FIG. 14, there may be a case of a vehicle lighting device in which a rear face member 48 (a portion indicated by a double-dashed line in FIG. 14) is provided at a side opposite to the direction in which the light from the semiconductor-type light source 3 is radiated, i.e., at a potion of a rear side (back side) of the heat sink member 2, or alternatively, an accommodation hole 65 in which the light source-side connector 34 is to be accommodated is provided at the rear face member 48. The rear face member 48 is a heat sink member, a lamp housing, or a bracket, etc., for example. In addition, the rear face member 48 is a thin rear face member 48A or a thick rear face member 48B, in accordance with a vehicle type.

The fixing member 5 is made of a member having elasticity and high thermal conductivity, and is made up of a cover member covered on the power-feeding fixing portion 33 of the power-feeding holder 4. The fixing member 5 is adapted to cover the power-feeding holder 4 and is fixed to the heat sink member 2; the power-feeding holder 4 is fixed to the heat-sink member 2; and the semiconductor-type light source 3 is fixed after sandwiched between the power-feeding holder 4 and the heat sink member 2.

The fixing member 5, as shown in FIGS. 3, 4, 9 to 12, and 16 to 19, is made of: a horizontal plate portion 49 shaped like a rectangular plate; and four vertical plate portions 50 formed by being bent vertically or substantially vertically from four corners of the horizontal plate portion 49. A rectangular opening 51 is provided at a center part of the horizontal plate portion 49. At the center parts of both the left and right side portions of the horizontal plate portion 49, elastic compression portions 52 formed in a slightly curved shape at the lower side are provided, respectively. The elastic compression portion 52 electrically compresses the power-feeding fixing portion 33 of the power-feeding holder 4 against the side of the heat sink member 2 by pushing the fixing member 5 to the heat sink member 2 from above.

At the four vertical plate portions 50, elastic engagement portions 53 shaped like rectangular plates (rectangular claws) are provided, respectively. Both the left and right sides and the upper side of the elastic engagement portion 53 are separated from the vertical plate portion 53 and the lower side of the elastic engagement portion 53 connects to the vertical plate portion 50, and the elastic engagement portion 53 is bent at the lower side so that the upper side is slightly oriented to the outside. At a time point when the elastic compression portion 52 has elastically compressed the power-feeding holder 4 against the side of the heat sink member 2 from above, the elastic engagement portion 53 elastically engages with the engagement portion 54 of the heat sink member 2, whereby the fixing member 5 is fixed to the heat sink member 2 and the power-feeding holder 4 is fixed to the heat sink member 2 together with the elastic compression portion 52.

The horizontal plate portion 49 of the fixing member 5 is adapted to cover the top face 28 of the peripheral edge part 26 of the power-feeding fixing portion 33 in the housing 19 of the power-feeding holder 4. A top face 61 of the horizontal plate portion 49 of the fixing member 5 is positioned lower than the top face 56 of the heat sink member 2. In the fixing member 5, in the case of a thin steel plate, one thin steel plate is constituted by means of a press-bending process, and in the case of a resin, it is constituted by means of integral molding. In other word, the fixing member 5 is made of one component.

The reflector 6 is made up of an optically opaque rein member or the like. In addition, in the reflector 6, as shown in FIGS. 1 to 3, a front side part is open in a semi-circular shape and a lower side portion is open, whereas a part from a front side part up to a rear side part through a center part (upper-side part) is closed. The reflector 6 is mounted on the heat sink member 2 by means of screws or bolts and nuts or other appropriate fixing means such as swaging or engagement fixing. On a recessed interior face of a closed portion at least from a substantial posterior half to a rear side part of the center part of the reflector 6, aluminum vapor deposition or solver plating, etc., is applied, and a reflecting surface 45 is provided.

The reflecting surface 45 is a convergent elliptical reflecting surface. In other words, the reflecting surface 45 is a reflecting surface of a free curved surface (NURBS-curved surface) with an ellipse being formed as a base (a reference, a key). The reflecting surface of a free curved surface (NURBS-curved surface) with the ellipse being formed as a base is made of a reflecting surface in which the vertical cross section of FIG. 3 forms an ellipse and a horizontal cross section (not shown) forms a parabola or a deformed parabola. The aforementioned reflecting surface 45 has a first focal point (not shown), a second focal point (not shown), and an optical axis (not shown). The second focal point is obtained as a focal line on a horizontal cross section, i.e., a curved focal line such that both ends are positioned at a front side and a center is positioned at a rear side when it is seen from the top (plane). The free curved surface (NURBS-curved surface) of the reflecting surface 45 is a NURBS free curved surface (Non-Uniform Rational B-Spline Surface) described in the literature entitled "Mathematical Elements for Computer Graphics (David F. Rogers, J Alan Adams). The reflecting surface 45 may be a reflecting surface made of a mere rotational elliptical surface having a first focal point, a second focal point, and an optical axis. In this case, the second focal point is obtained as a focal point instead of a focal line. The reflecting surface 45 of the reflector 6 reflects light from the semiconductor-type light source 3.

The projecting lens 7, as shown in FIGS. 1 to 3, is a convex lens of a non-spherical lens forming a circle when viewed from the front. The front side (external side) of the projecting lens 7 forms a convex non-spherical surface with large curvature (with small radius of curvature), whereas the rear side of the projecting lens 7 (the side of the semiconductor-type light source 3) forms a convex non-spherical surface with small curvature (with large radius of curvature). By using such a projecting lens 7, a focal distance of the projecting lens 7 is reduced, and the dimensions in the optical-axis direction of the projecting lens 7 of the vehicle lighting device 1 in the embodiment is also reduced accordingly. The rear side of the projecting lens 7 may form a flat non-spherical surface (a plane).

The projecting lens 7, as shown in FIGS. 1 to 3, is fixed to a front part formed in the frame shape of the heat sink member 2. In other words, a lower half of the peripheral edge protrusion portion of the projecting lens 7 is fixed by appropriate fixing means to a front end of the front part formed in a semi-cylindrical frame shape of the heat sink member 2. Therefore, a clearance 62 is formed between an upper half of the projecting lens 7 and the reflector 7, and a clearance 63 is formed between a lower half of the projecting lens 7 and a rear part in the block shape of the heat sink member 2. As a result, airflow (thermal convection) occurs due to the clearance 62, 63 and the window portion 64 of the closed portion of the front part shaped like a frame of the heat sink member 2, and a heat radiation effect can be improved.

The projecting lens has a front side focal point (which is a focal point at the side of the semiconductor-type light source 3, although not shown), a rear side focal point (which is an external focal point, although not shown), and an optical axis (not shown) connecting the front side focal point and the rear side focal point to each other. An optical axis of the reflecting surface 45 and that of the reflecting lens 7 are coincident or substantially coincident with each other. A front-side focal point of the projecting lens 7 is a lens focal point (a meridional image surface which is a focal-point surface at an object space side). The lens focal point of the projecting lens 7 is positioned at the second focal point of the reflecting surface 45 or its periphery. The light from the semiconductor-type light source 3 does not have a high heat, so that a resin-based lens can be used as the projecting lens 7. The projecting lens 7 is made of acryl in this embodiment. The projecting lens 7 projects (radiates) the reflected light from the reflecting surface 45 of the reflector 6 to the outside (the front of the vehicle).

The vehicle lighting device 1 in the embodiment is made up of constituent elements described above, i.e., the heat sink member 2, the semiconductor-type light source 3 (made up of the board 9, the light emitter 30, the light transmitting member 31, and the base 23), the power-feeding holder 4 (made up of the two contacts 35A, 35B and the housing 19); the fixing member 5, the reflector 6, and the projecting lens 7. Hereinafter, a procedure for assembling the aforementioned constituent elements will be described.

First, the spring portion 12 formed in a U-shape is pressed in the storage groove 11 of the heat sink member 2 shown in FIG. 8 from above with a curved portion being set at a lower part and with an elongated vertical portion being set at a rear side (see FIGS. 10, 11, 19).

Next, the semiconductor-type light source 3 is directly placed on the placement base 8 of the heat sink member 2 from above (see FIGS. 7, 10, 11, 19). At this time, with the positioning portions 10, 10 and the receptacle portion 14 of the heat sink member 2 being a guide, the semiconductor-type light source 3 is sandwiched between the positioning portions 10, 10 and between an upper end part of a vertical portion at the rear side of the spring portion 12 and the receptacle portion 14. In addition, due to the elastic force of the spring portion 12, the semiconductor-type light source 3 is held against the side of the receptacle portion 14 in the crossing direction on a plane of the placement base 8 with respect to the positioning direction (transverse direction) of the positioning portions 10, 10, i.e., in a back direction. As a result, the semiconductor-type light source 3 is directly placed on the placement base 8 of the heat sink member 2 in a state in which the location in two directions (a transverse direction and a longitudinal direction) crossing each other on the plane of the placement base 8 is determined.

When the semiconductor-type light source 3 is directly placed on the placement base 8 of the heat sink member 2 from above, the upper end part 13 of the rear side vertical portion of the spring portion 12 protruding upwardly from the top face of the heat sink member 2 is slightly inclined to the front side and the front side upper end part of the receptacle portion 14 forms an inclined face, and further, the upper end part at a mutually opposite site of the two positioning portions 10, 10 forms an inclined face, thus making it easy to directly place the semiconductor-type light source 3 on the placement base 8 of the heat sink member 2.

A work of pressing the spring portion 12 formed in the U-shape in the storage groove 11 of the heat sink member 2 and a work of directly placing the semiconductor-type light source 3 on the placement base 8 of the heat sink member 2 from above may be performed by reversing their procedural steps.

Next, the power-feeding holder 4 is set on the heat sink member 2 and the semiconductor-type light source 3 from above (see FIGS. 5, 6, 10, 11, 19). In other words, the power-feeding fixing portion 33 and the connector-side portion 34 of the power-feeding holder 4 are accommodated in the accommodation recessed portion 57 and the storage portion 17 of the heat sink member 2 from above. In addition, the circular protrusion portions 22, 22 of the power-feeding holder 4 are engaged with circular recessed portions 21, 21 of the heat sink member 2 from above (see FIG. 17). Further, the connecting portions 36, 36, 36, 36 of the power-feeding holder 4 are brought into elastic contact with the top of the electrically conductive members 32, 32 of the semiconductor-type light source 3 (see FIGS. 5, 6, 17). Furthermore, the four holding protrusion portions 41, 41, 41, 41 of the power-feeding holder 4 are set on four corners of the board 9 of the semiconductor-type light source 3 (see FIGS. 15, 16). At this time, the circular protrusion portions 22, 22 of the power-feeding holder 4 engage in the circular recessed portions 21, 21 of the heat sink member 2, so that mutual locations of the heat sink member 2 and the power-feeding holder 4 can be determined. In addition, mutual locations of the heat sink member 2 and the semiconductor-type light source 3 are determined by means of the positioning portions 10, 10, the spring portion 12, and the receptacle portion 14. Thus, mutual locations of the semiconductor-type light source 3 and the power-feeding holder 4 are predetermined via the heat sink member 2. In other words, the mutual locations of the heat sink member 2, the semiconductor-type light source 3, and the power-feeding holder 4 are predetermined. Further, the connecting portions 36, 36, 36, 36 of the power-feeding holder 4 are in elastic contact with the top of the electrically conductive members 32, 32 of the board 9 of the semiconductor-type light source 3, thereby enabling power feeding to the semiconductor-type light source 3. Furthermore, the holding protrusion portions 41, 41, 41, 41 of the power-feeding holder 4 are set at four corners of the board 9 of the semiconductor-type light source 3, whereby the semiconductor-type light source 3 is held at the side of the heat sink member 2.

Afterwards, the vertical plate portion 50 of the fixing member 5 is inserted into the insert hole 55 of the heat sink member 2 from above. In addition, the horizontal plate portion 49 of the fixing member 5 is adapted to cover the peripheral edge part 26 of the power-feeding fixing portion 33 of the power-feeding holder 4 from above (see FIGS. 4, 10, 11, 19). When the vertical plate portion 50 of the fixing member 5 is inserted into the insert hole 55 of the heat sink member 2, the elastic engagement portion 53 of the fixing member 5 is in an inwardly slackened state. At a time point when the elastic compression portion 52 of the fixing member 5 is elastically compressed on the peripheral edge part 26 of the power-feeding fixing portion 33 of the power-feeding holder 4, the elastic engagement portion 53 of the fixing member 5 that is in the inwardly slackened state is elastically restored; protrudes to the outside; and elastically engages with the engagement portion 54 of the heat sink member 2 As a result, the elastic compression portion 52 and the elastic engagement portion 53 of the fixing member 5 elastically pinch the peripheral edge part 26 of the power-feeding fixing portion 33 of the power-feeding holder 4 and the engagement portion 54 of the heat sink member 2 from above and beneath; and the heat sink member 2, the semiconductor-type light source 3, and the power-feeding holder 4 are fixed by means of the fixing member 5.

In other words, the elastic engagement portion 53 of the fixing member 5 elastically engages with the engagement portion 54 of the heat sink member 2, whereby the fixing member 5 is fixed to the heat sink member 2. In addition, the peripheral edge part 26 of the power-feeding fixing portion 33 of the power-feeding holder 4 is sandwiched between the horizontal plate portion 49 and the elastic compression portion 52 of the fixing member 5, and the top face 58 of the accommodation recessed portion 57 of the heat sink member 2, whereby the power-feeding holder 4 is fixed to the heat sink member 2 by means of the fixing member 5. Further, four corners of the board 9 of the semiconductor-type light source 3 are sandwiched between the holding protrusion portions 41, 41, 41, 41 of the power-feeding holder 4 and the top face 59 of the placement base 8 of the heat sink member 2, whereby the semiconductor-type light source 3 is fixed to the heat sink member 2.

Afterwards, the reflector 6 is set to the heat sink member 2 from above, and the reflector 6 is fixed to the heat sink member 2 by appropriate fixing means. In addition, the projecting lens 7 is set to the heat sink member 2 from above, and the projecting lens 7 is fixed to the heat sink member 2 by appropriate fixing means (see FIGS. 1, 2, 3).

In this manner, the vehicle lighting device 1 is constituted by assembling constituent elements of the heat sink member 2, the semiconductor-type light source 3, the power-feeding holder 4, the fixing member 5, the reflector 6, and the projecting lens 7. The vehicle lighting device 1 in the embodiment may be mounted in plurality on a bracket (not shown) in a lamp room partitioned by the lamp housing and the lamp lens of a headlamp for automobile, although not shown.

The vehicle lighting device in the embodiment is made of the above constituent elements, and hereinafter, their relevant functions will be described.

First of all, as shown in FIGS. 13A and 13B, the power source-side connector 20 is plugged in a plug-in hole 44 of the light source-side connector 34 of the power-feeding holder 4 of the vehicle lighting device, electrically connecting a female terminal portions 43 of the power source-side connector 20 and a male terminal portion 42 of the light source-side connector 34 of the power-feeding holder 4 of the vehicle lighting device 1.

Next, the light emitter 30 of the semiconductor-type light source 3 of the vehicle lighting device 1 is lit to emit light. The light is then radiated from the light emitter 30 of the semiconductor-type light source 3. This light passes through the light transmitting member 31 of the semiconductor-type light source 3 and is reflected on the reflecting surface 45 of the reflector 6, and the reflected light concentrates on a second focal point of the reflecting surface 45. A part of the reflected light concentrating on the second focal point is cut off by means of the shade 15. The remains of the reflected light that has not been cut off by means of this shade 15 form a predetermined light distribution pattern having a cutoff line. By providing a reflecting surface on the shade 15, the reflected light cut off by means of the shade 15 is reflected on the reflecting surface of the shade 15, and a predetermined auxiliary light distribution pattern can be formed.

A predetermined light distribution pattern (or a predetermined light distribution pattern and a predetermined auxiliary light distribution pattern) passes through the projecting lens 7, and for example, a light distribution pattern for passing (or a light distribution pattern for passing and a light distribution pattern for overhead sign) is projected (radiated) to the front of an automobile (vehicle), illuminating a road surface, etc.

The vehicle lighting device 1 in the embodiment is made of the above constituent elements and functions, and hereinafter, advantageous effect of the device will be described.

The vehicle lighting device 1 in the embodiment allows components made of the heat sink member 2, the semiconductor-type light source 3, the power-feeding holder 4, and the fixing member 5 to be assembled in one top-to-down direction. In other words, the semiconductor-type light source 3 is directly placed on the top face 59 of the placement base 8 of the heat sink member 2 from above; the power-feeding holder 4 is set on the semiconductor-type light source 3 and the heat sink member 2 from above; the semiconductor-type light source 3 is held at the side of the heat sink member 2, enabling a power current to be fed to the semiconductor-type light source 3; the fixing member 5 is adapted to cover the power-feeding holder 4 from above, the power-feeding holder 4 is fixed to the heat sink member 2 and the semiconductor-type light source 3 is sandwiched and fixed between the power-feeding holder 4 and the heat sink member 2. In this manner, the vehicle lighting device 1 in the embodiment allows components made up of the heat sink member 2, the semiconductor-type light source 3, the power-feeding holder 4, and the fixing member 5 to be assembled in one top-to-down direction, thus improving workability of assembling components, and moreover, enabling automated assembling of components. In particular, in the vehicle lighting device 1 in the embodiment, the reflector 6 and the projecting lens 7 can be set and mounted on the heat sink member 2 from above, thus improving workability of assembling components including the reflector 6 and the projector lens 7, and moreover, enabling automated assembling of components.

Further, in the vehicle lighting device 1 in the embodiment, in a state in which the semiconductor-type light source 3 is directly placed on the top face 59 of the placement base 8 of the heat sink member 2, the power-feeding holder 4 is fixed to the heat sink member 2 by means of the fixing member 5 and the semiconductor-type light source 3 is sandwiched and fixed between the power-feeding holder 4 and the heat sink member 2. As a result, the vehicle lighting device 1 in the embodiment allows the semiconductor-type light source 3 to be in direct contact with the heat sink member 2, thus improving heat transmission from the semiconductor-type light source 3 to the heat sink member 2 and attaining a significant heat radiation effect of the semiconductor-type light source 3.

Moreover, the vehicle lighting device 1 in the embodiment allows the light source-side connector 34 and the power source-side connector 20 of the power-feeding holder 4 to be positioned at an opposite side to the direction in which the light from the semiconductor-type light source 3 is radiated, i.e., at a rear side (back side), so that dimensions in longitudinal and transverse directions can be reduced in comparison with a lighting device in which a light source-side connector and a power source-side connector of a power-feeding holder are positioned at a plane side (upper side), a bottom face side (lower side), a left face side (left side), and a right face side (right side). Furthermore, the light source-side connector 34 and the power source-side connector 20 of the power-feeding holder 4 are invisible when they are seen from the front face side (front side). For example, as in the embodiment, in the lighting device in which a lens such as the projecting lens 7 or a lamp lens of a headlamp for automobile is positioned on the front side, the light source-side connector 34 and the power source-side connector 20 of the power-feeding holder 4 are never seen with these connectors being moved to a lens, thus improving appearance or design properties. In addition, in comparison with a lighting device in which a light source-side connector and a power source-side connector of a power-feeding holder are positioned on a front face side, radiation of the light from the semiconductor-type light source cannot be prevented, thus eliminating influence on light distribution.

In addition, the vehicle lighting device 1 in the embodiment, as shown in FIG. 14, allows the light source-side connector 34 to be accommodated in the accommodation hole 65 of the rear face member 48 (such as a heat sink member, a lamp housing, or a bracket, for example). Thus, the vehicle lighting device 1 in the embodiment is capable of accommodating the light source-side connector 34 in the accommodation hole 65 of the rear face member 48 in the lighting device in which the rear face member 48 is provided at the opposite side to the direction in which the light from the semiconductor-type light source 3 is radiated, i.e., at the rear side, so that dimensions of the rear face side can be reduced by a space saved by accommodating the light source-side connector 34 in the accommodation hole 65 of the rear face member 48. In this manner, the vehicle lighting device 1 in the embodiment allows the dimensions of the rear face side to be reduced utilizing a space for the rear face member 48 provided at the rear side and the lighting device can be downsized accordingly.

Further, in the case of the rear face member 48A which is thinner than the rear face member 48, a state of whether or not the lock portion 18 of the power source-side connector 20 is locked with an edge of the lock hole 24 can be visually checked through the lock hole 24 of the light source-side connector 34. On the other words, in the case of the rear face member 48B which is thicker than the rear face member 48, dimensions for accommodating the light source-side connector 34 in the accommodation hole 65 of the rear face member 48 increases, and the dimensions of the rear face side can be reduced and the lighting device can be downsized accordingly.

Further, in the vehicle lighting device 1 in the embodiment, the lock hole 24 in which the lock portion 18 of the power source-side connector 20 is to be locked is provided at the light source-side connector 34. Thus, a lock state between the edge of the lock hole 24 of the light source-side connector 34 and the lock portion 18 of the power source-side connector 20 can be checked through the lock hole 24; the edge of the lock hole 24 of the light source-side connector 34 and the lock portion 18 of the power source-side connector 20 can be securely locked; and assembling properties of the light source-side connector 34 and the power source-side connector 20 are improved.

Further, the vehicle lighting device 1 in the embodiment allows a ready-made connector for automobile to be used as the power source-side connector 20 for electrically connecting to the light source-side connector 34 of the power-feeding holder 4, and reliability of electrical connection between the light source-side connector 34 and the power source-side connector 20 can be improved. Moreover, in the vehicle lighting device 1 in the embodiment, by adjusting the lock hole 24 of the light source-side connector 34, a lock state between the lock hole 24 of the light source-side connector 34 and the lock portion 18 of the power source-side connector 20 can be set in an unlock-disable state or can be set in an unlock-enable state, in accordance with a vehicle type.

Furthermore, in the vehicle lighting device 1 in the embodiment, the heat sink member 2 and the semiconductor-type light source 3 can be positioned by means of the positioning portions 10, 10, the spring portion 12, and the receptacle portion 14 of the heat sink member 2. In addition, the heat sink member 2 and the power-feeding holder 4 can be positioned by means of the circular recessed portions 21, 21 and the circular protrusion portions 22, 22 of the positioning portion between the heat sink member 2 and the power-feeding holder 4. Further, the semiconductor-type light source 3 and the power-feeding holder 4 can be positioned via the heat sink member 2. As a result, in the vehicle lighting device 1 in the embodiment, the heat sink member 2, the semiconductor-type light source 3, and the power-feeding holder 4 can be mutually positioned with high precision. Moreover, the heat sink member 2, the semiconductor-type light source 3, and the power-feeding holder 4 positioned with high precision are fixed by means of the fixing member 5, so that the light from the semiconductor-type light source 3 can be controlled with high precision and light distribution can be controlled with high precision.

In particular, in the vehicle lighting device 1 in the embodiment, the board 9 of the semiconductor-type light source 3 is sandwiched and fixed between the housing 19 of the power-feeding holder 4 and the heat sink member 2, whereas the contacts 35A, 35B of the power-feeding holder 4 electrically connect to the electrically conductive members 32, 32 of the semiconductor-type light source 3. As a result, in the vehicle lighting device 1 in the embodiment, the semiconductor-type light source 3 can be sandwiched and securely fixed between the power-feeding holder 4 and the heat sink member 2, whereas the contacts 35A, 35B of the power-feeding holder 4 can electrically connect to the electrically conductive members 32, 32 of the semiconductor-type light source 3 in a stable state (with a compression force). In this manner, the vehicle lighting device 1 in the embodiment can reduce abrasion (friction) between the electrically conductive members 32, 32 of the semiconductor-type light source 3 and the contacts 35A, 35B of the power-feeding holder 4 due to backlash or displacement of the semiconductor-type light source 3, whereas it can provide stable power-feeding to the semiconductor-type light source 3.

In addition, the vehicle lighting device 1 in the embodiment allows four corners of a rectangular board 9 of the semiconductor-type light source 3 to be sandwiched and fixed between four holding the protrusion portions 41, 41, 41, 41 of the housing 19 of the power-feeding holder 4 and four corners of the rectangular placement base 8 of the heat sink member 2, so that the semiconductor-type light source 3 can be sandwiched and more securely fixed between the power-feeding holder 4 and the heat sink member 2. Moreover, the vehicle lighting device 1 in the embodiment allows the connecting portions 36, 36, 36, 36 of the contacts 35A, 35B of the power-feeding holder 4 to be in electrical elastic contact with the electrically conductive members 32, 32 of the semiconductor-type light source 3. Thus, a degree of adhesion between the placement base 8 of the heat sink member 2 and the board 9 of the semiconductor-type light source 3 increases due to a holding force of the four holding the protrusion portion 41, 41, 41, 41 in the housing 19 of the power-feeding holder 4 and an elastic contact force of the connecting portions 36, 36, 36, 36 of the contacts 35A, 35B of the power-feeding holder 4, and heat conduction from the semiconductor-type light source 3 to the heat sink member 2 is improved and a heat radiation effect is improved accordingly.

Further, in the vehicle lighting device 1 in the embodiment of the present invention, the light emitter 30 of the semiconductor-type light source 3 is positioned on a face which is substantially identical to the top face 56 of the heat sink member 2 in height, i.e., to the top face 56 of the shade 15. The power-feeding holder 4 and the fixing member 5 are positioned lower than the top face 56 of the light emitter 30 of the semiconductor-type light source 3 and the top face 56 of the heat sink member 2, i.e., the top face 56 of the shade 15. Thus, the power-feeding holder 4 and the fixing member 5 never become obstacles to the light from the light emitter 30 of the semiconductor-type light source 3, and an optical problem never arises. Moreover, the power-feeding holder 4 and the fixing member 5 are never seen from a front face side (front side) of the lighting device, and an appearance problem never arises. Therefore, in the vehicle lighting device 1 in the embodiment, optical performance can be met, an optical system is improved, and design properties are improved.

Furthermore, in the vehicle lighting device 1 in the embodiment of the present invention, the contacts 35A, 35B of the power-feeding holder 4 each are in electrical contact with the electrically conductive members 32, 32 of the semiconductor-type light source 3 in a location lower than the top face 56 of the light emitter 30 of the semiconductor-type light source 3 and of the heat sink member 2, i.e., the top face 56 of the shade 15; and the housing 19 of the power-feeding holder 4 sandwiches and fixes the board 9 of the semiconductor-type light source 3 between the housing and the heat sink member 2. Thus, in the vehicle lighting device 1 in the embodiment, the contacts 35A, 35B of the power-feeding holder 4 and the housing 19 never become obstacles to the light from the light emitter 30 of the semiconductor-type light source 3, and an optical problem never arises, and moreover, the power-feeding holder 4 and the fixing member 5 are never seen from the front face side (front side) of the lighting device, and an appearance problem never arises. Therefore, in the vehicle lighting device 1 in the embodiment, optical performance can be met, an optical system is improved, and design properties are improved.

Furthermore, the vehicle lighting device 1 in the embodiment allows the housing 19 of the power-feeding holder 4 to be made of upper and lower two-stepped layers of the center part 25 and the peripheral edge part 26. Thus, the top face 61 of the horizontal plate portion 49 of the fixing member 5, covering the top face 28 of the peripheral edge part 26 of the housing 19 of the power-feeding holder 4, is positioned in a location lower than the top face 27 of the center part 25 of the housing 19 of the power-feeding holder, i.e., the top face 56 of the light emitter 30 of the semiconductor-type light source 3 and of the heat sink member 2 (the top face 56 of the shade 15) or substantially identical to the top face 56 of the heat sink member 2 (the top face 56 of the shade 15) in height. In addition, in a location lower than the top face 56 of the light emitter 30 of the semiconductor-type light source 3 and of the heat sink 2 (the top face 56 of the shade 15), the connecting portions 36, 36, 36, 36 of the contacts 35A, 35B at the center part 25 of the housing 19 of the power-feeding holder 4 are in electrical contact with the electrically conductive members 32, 32 of the semiconductor-type light source 3 and the holding protrusion portions 41, 41, 41, 41 at the center part 25 of the housing 19 of the power-feeding holder 4 sandwich and fix the board 9 of the semiconductor-type light source 3 between the protrusion portions and the heat sink member 2. Thus, in the vehicle lighting device 1 in the embodiment, the fixing member 5, the contacts 35A, 35B of the power-feeding holder 4, and the housing 19 never become obstacles to the light from the light emitter 30 of the semiconductor-type light source 3, and an optical problem never arises. Moreover, the power-feeding holder and fixing member are never seen from the front face side (front side) of the lighting device, and an appearance problem never arises. Therefore, in the vehicle lighting device 1 in the embodiment, optical performance cannot be met, an optical system is improved, and design properties are improved.

Furthermore, in the vehicle lighting device 1 in the embodiment, the fixing member 5 shaped like a covering member, made of a member with its high thermal conductivity, is adapted to cover the power-feeding fixing portion 33 of the power-feeding holder 4 (the top face 28 of the peripheral edge part 26 of the housing 19). Thus, the heat from the semiconductor-type light source 3 is transmitted to the fixing member 5 via the power-feeding holder 4 or directly, and the heat radiation effect of the semiconductor-type light source 3 further increases.

Furthermore, in the vehicle lighting device 1 in the embodiment, the semiconductor-type light source 3 can be fixed to the heat sink member 2 without need to use fixing means such as screws, and a power current can be fed to the semiconductor-type light source 3 without need to use a soldering iron, etc. Thus, workability of assembling components is further improved.

Furthermore, in the vehicle lighting device 1 in the embodiment, in a state in which the semiconductor-type light source 3 having the power-feeding holder 4 directly placed on the heat sink member 2 is held at the side of the heat sink member 2 and a power current can be fed to the semiconductor-type light source 3, the semiconductor type light source 3 and the power-feeding holder 4 are fixed to the heat sink member 2 by means of the fixing member 5. As a result, the vehicle lighting device 1 in the embodiment is directly placed on the heat sink member 2, so that vertical dimensions can be reduced.

Furthermore, in the vehicle lighting device 1 in the embodiment, the contacts 35A, 35B of the power-feeding holder 4 are made up of: the connecting portions 36, 36, 36, 36 which are in electrical contact with the semiconductor-type light source 3 in a vertical direction; the male terminal portions 42, 42 electrically connecting to the power source-side connector 20 in a horizontal direction; and the connection wiring portions 37, 37, 38, 38, 39, 39 for electrically connecting the connecting portions 36, 36, 36, 36 and the male terminal portions 42, 42 disposed in a horizontal direction, so that vertical dimensions of the power-feeding holder 4 can be reduced. In this manner, the vehicle lighting device 1 in the embodiment can further reduce vertical dimensions, and a vertically compact lighting device can be provided.

Furthermore, in the vehicle lighting device 1 in the embodiment, the storage portion 17 in which the light source-side connector 34 of the power-feeding holder 4 is stored is provided at the heat sink member 2, so that vertical dimensions can be further reduced, and a vertically compact lighting device can be provided accordingly.

Furthermore, in the vehicle lighting device 1 in the embodiment, the fixing member 5 is made of one component, so that the number of components can be reduced. In addition, in the vehicle lighting device 1 in the embodiment, merely by holding the fixing member 5 in the heat sink member 2 from above, the power-feeding holder 4 can be fixed to the heat sink member 2 and the semiconductor-type light source 3 can be sandwiched and fixed between the power-feeding holder 4 and the heat sink member 2. Thus, a work of fixing the semiconductor-type light source 3, the power-feeding holder 4, the heat sink member 2, and the fixing member 5 is simplified, and workability of assembling components is further improved accordingly.

Furthermore, in the vehicle lighting device 1 in the embodiment, the elastic compression portion 52 of the fixing member 5 elastically compresses the power-feeding fixing portion 33 of the power-feeding holder 4 (the peripheral edge part 26 of the housing 19) against the side of the top face 58 of the accommodation recessed portion 57 of the heat sink member 2 from above. Thus, the semiconductor-type light source 3 can be held at the side of the heat sink member 2 via the power-feeding holder 4, and moreover, the holding force can be adjusted by adjusting an elastic force of the elastic compression portion 52. Therefore, in the vehicle lighting device 1 in the embodiment, heat transmission from the semiconductor-type light source 3 to the heat sink member 2 is improved; the heat radiation effect of the semiconductor-type light source 3 increases; and damage of the semiconductor-type light source 3 can be prevented. In other words, if a force of holding the semiconductor-type light source 3 at the side of the heat sink member 2 is small, a thermal resistance arises between the semiconductor-type light source 3 and the heat sink member 2, or alternatively, if the force is large, the semiconductor-type light source 3 may be damaged.

Hereinafter, an example other than the foregoing embodiment will be described. The foregoing embodiment described a headlamp for automobile as a vehicle lighting device. Whereas in the present invention, the vehicle lighting device may be a lighting device other than the headlamp for automobile, for example a fog lamp, an AFS additional lamp, a cornering lamp, or a tail lamp, a brake lamp, a tail braking lamp, or a backup lamp of rear combination lamps.

What is claimed is:

1. A vehicle lighting device, comprising:
(i) a heat sink member;
(ii) a semiconductor-type light source which is directly placed on a top face of the heat sink member;
(iii) a power-feeding holder which is set on the semiconductor-type light source and the heat sink member, for holding the semiconductor-type light source at a side of the heat sink member and feeding a power current to the semiconductor-type light source; and
(iv) a fixing member which is adapted to cover a portion of a top face of the power-feeding holder and is fixed to the heat sink member, for fixing the power-feeding holder to the heat sink member and sandwiching and fixing the semiconductor-type light source between the power-feeding holder and the heat sink member,
wherein: a light sources-side to which a power source-side connector electrically connects is provided at a portion of the power-feeding holder, at an opposite side to a direction in which light from the semiconductor-type light source is radiated.

2. The vehicle lighting device according to claim 1, wherein:
a lock hole in which a lock portion of the power source-side connector is locked is provided at the light source-side connector.

3. A vehicle lighting device, comprising:
(i) a heat sink member;
(ii) a semiconductor-type light source which is directly placed on a top face of the heat sink member;
(iii) a power-feeding holder which is set on the semiconductor-type light source and the heat sink member, for holding the semiconductor-type light source at a side of the heat sink member and feeding a power current to the semiconductor-type light source; and
(iv) a fixing member which is adapted to cover the power-feeding holder and is fixed to the heat sink member, for fixing the power-feeding holder to the heat sink member and sandwiching and fixing the semiconductor-type light source between the power-feeding holder and the heat sink member,
wherein: a light sources-side connector to which a power source-side connector electrically connects is provided at a portion of the power-feeding holder, at an opposite side to a direction in which light from the semiconductor-type light source is radiated, a rear face member is provided at a portion of the heat sink member, at an opposite side to a direction in which light from the semiconductor-type light source is radiated; and an accommodation hole in which the light source-side connector is accommodated is provided at the rear face member.

4. A vehicle lighting device, comprising:

(i) a heat sink member;

(ii) a semiconductor-type light source which is directly placed on a top face of the heat sink member;

(iii) a power-feeding holder which is set on the semiconductor-type light source and the heat sink member, for holding the semiconductor-type light source at a side of the heat sink member and feeding a power current to the semiconductor-type light source; and (iv) a fixing member which is adapted to cover the power-feeding holder and is fixed to the heat sink member, for fixing the power-feeding holder to the heat sink member and sandwiching and fixing the semiconductor-type light source between the power-feeding holder and the heat sink member, wherein: a light sources-side connector to which a power source-side connector electrically connects is provided at a portion of the power-feeding holder, at an opposite side to a direction in which light from the semiconductor-type light source is radiated, a positioning portion for determining a position in one direction of the semiconductor-type light source;

a spring portion having a spring force acting on a crossing direction with respect to a positioning direction of the positioning portion; and a receptacle portion which is opposite to the spring portion with the semiconductor-type light source being sandwiched in a direction in which the elastic force of the spring portion acts, for receiving the semiconductor-type light source being held by an elastic force of the spring portion, are provided on the top face on which the semiconductor-type light source is placed, of the heat sink member, and wherein:

a positioning portion for determining a mutual position of the heat sink member and the power-feeding holder is provided at a respective one of the power-feeding holder and the heat sink member opposite to each other with the semiconductor-type light source being sandwiched therebetween.

5. A vehicle lighting device, comprising:

(i) a heat sink member having a recessed storage portion;

(ii) a semiconductor-type light source for light radiation, which is placed in the storage portion of the heat sink member;

(iii) a light source fixing portion for fixing the semiconductor light source in the storage portion of the heat sink member and connecting to a power source in order to feed a power current to the semiconductor-type light source fixed in the storage portion, wherein: the light source fixing portion is arranged in the storage portion of the heat sink member in a state in which the semiconductor-type light source is placed in the storage portion of the heat sink member; and the semiconductor-type light source is sandwiched and fixed between the light source fixing portion and the storage portion of the heat sink member in the storage portion of the heat sink member, the light source fixing portion includes:

a power-feeding holder which is set on the semiconductor-type light source and the heat sink member, for holding the semiconductor-type light source in the storage portion of the heat sink member; and a fixing member which is arranged on the power-feeding holder in the storage portion of the heat sink member in a state in which the power-feeding holder holds the semiconductor-type light source, in the storage portion of the heat sink member; and the fixing member includes an engagement portion engaging with the storage portion of the heat sink member, for fixing the power-feeding holder to a side of the storage portion of the heat sink member and sandwiching and fixing the semiconductor-type light source between the power-feeding holder and the storage portion of the heat sink member, the power-feeding holder includes a light source-side connector which is accommodated in a portion of the storage portion of the heat sink member, at an opposite side to a light radiation direction of the semiconductor-type light source, the connector being adapted to connect to the power source.

6. A vehicle lighting device comprising:

(i) a heat sink member having a recessed storage portion;

(ii) a semiconductor-type light source for light radiation, which is placed in the storage portion of the heat sink member;

(iii) a light source fixing portion for fixing the semiconductor light source in the storage portion of the heat sink member and connecting to a power source in order to feed a power current to the semiconductor-type light source fixed in the storage portion, wherein: the light source fixing portion is arranged in the storage portion of the heat sink member in a state in which the semiconductor-type light source is placed in the storage portion of the heat sink member; and the semiconductor-type light source is sandwiched and fixed between the light source fixing portion and the storage portion of the heat sink member in the storage portion of the heat sink member, the light source fixing portion includes:

a power-feeding holder which is set on the semiconductor-type light source and the heat sink member, for holding the semiconductor-type light source in the storage portion of the heat sink member; and a fixing member which is arranged on the power-feeding holder in the storage portion of the heat sink member in a state in which the power-feeding holder holds the semiconductor-type light source, in the storage portion of the heat sink member; and the fixing member includes an engagement portion engaging with the storage portion of the heat sink member, for fixing the power-feeding holder to a side of the storage portion of the heat sink member and sandwiching and fixing the semiconductor-type light source between the power-feeding holder and the storage-portion of the heat sink member, the power-feeding holder has a protrusion portion on a face opposite to the storage portion of the heat sink member; and the storage portion of the heat sink member includes:

a placement base on which the semiconductor-type light source is placed;

a positioning portion which is provided at least at one side around the placement base, for positioning the semiconductor-type light source placed on the placement base; and a recessed portion engaging with the protrusion portion of the power-feeding holder, for positioning the power-feeding holder and the storage portion of the heat sink member when the power-feeding holder holds the semiconductor-type light source in the storage portion of the heat sink member.

7. A vehicle lighting device, comprising:

(i) a heat sink member having a recessed storage portion;

(ii) a semiconductor-type light source for light radiation, which is placed in the storage portion of the heat-sink-member; and (iii) a light source filing portion which is arranged in the storage portion of the heat sink member, for fixing the semiconductor-type light source in the storage portion of the heat sink member and connecting to a power source in order to feed a power current to the semiconductor-type light source fixed in the storage portion, wherein: the light source fixing portion includes:

a power-feeding holder which is set on the storage portion of the heat sink member and the semiconductor-type light source, the holder having an opening, the holder being adapted to expose from the opening the semiconductor-type light source placed in the storage portion of the heat sink member and to hold a base portion of the semiconductor-type light source it a side of the storage portion of the heat sink member by means of a peripheral edge of the opening; and an engagement portion engaging with the storage portion of the heat sink member, for fixing the power-feeding holder to the side of the storage portion of the heat sink member and sandwiching and fixing the semiconductor-type light source between the power-feeding holder and the storage portion of the heat sink member.

8. The vehicle lighting device according to claim 7, wherein:

the engagement portion of the light source fixing portion is provided at a fixing member arranged on the power-feeding holder in a state in which the peripheral edge of the opening of the power-feeding holder holds the base portion of the semiconductor-type light source at the side of the storage portion of the heat sink member, in the storage portion of the heat sink member.

9. The vehicle lighting device according to claim 7, wherein:

the power-feeding holder includes a light source-side connector which is stored in a portion at an opposite side to a light radiation direction of the semiconductor-type light source in the storage portion of the heat sink member, the connector being, adapted to connect to the power source.

* * * * *